United States Patent
Weiss et al.

(10) Patent No.: US 11,155,723 B2
(45) Date of Patent: Oct. 26, 2021

(54) ON-ORBIT ADDITIVE MANUFACTURING OF PARABOLIC REFLECTORS VIA SOLAR PHOTOPOLYMERIZATION

(71) Applicant: Mitsubishi Electric Research Laboratories, Inc., Cambridge, MA (US)

(72) Inventors: Avishai Weiss, Cambridge, MA (US); William Yerazunis, Acton, MA (US); Richard Cottrell, Westport, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 58 days.

(21) Appl. No.: 16/656,618

(22) Filed: Oct. 18, 2019

(65) Prior Publication Data
US 2021/0115274 A1   Apr. 22, 2021

(51) Int. Cl.
| | |
|---|---|
| *C08F 2/46* | (2006.01) |
| *C08F 2/50* | (2006.01) |
| *C08G 61/04* | (2006.01) |
| *C09D 11/101* | (2014.01) |
| *B33Y 70/00* | (2020.01) |
| *C09D 11/107* | (2014.01) |
| *C09D 11/38* | (2014.01) |

(52) U.S. Cl.
CPC .......... *C09D 11/101* (2013.01); *B33Y 70/00* (2014.12); *C09D 11/107* (2013.01); *C09D 11/38* (2013.01)

(58) Field of Classification Search
CPC ............... C08F 2/46; C08F 2/50; C08G 61/04

USPC ................. 522/64, 6, 71, 189, 184, 1; 520/1
See application file for complete search history.

(56) References Cited

U.S. PATENT DOCUMENTS

2008/0090930 A1 * 4/2008 Madhusoodhanan .. C09D 11/30
522/83

FOREIGN PATENT DOCUMENTS

| CN | 107383731 | * 11/2017 |
|---|---|---|
| CN | 108603091 | * 9/2018 |

OTHER PUBLICATIONS

Liu et al, CN 107383731 Machine Translation, Nov. 24, 2017 (Year: 2017).*
Tamagawa et al, CN 108603091 Machine Translation, Sep. 29, 2018 (Year: 2018).*

* cited by examiner

*Primary Examiner* — Jessica Whiteley
(74) *Attorney, Agent, or Firm* — Gene Vinokur; Hironori Tsukamoto

(57) ABSTRACT

Resin formulation including: a mixture of low volatility oligomers is about 40% to 75% weight of the resin formulation; a plasticizer is about 25% to 55% by weight of the resin formulation; a photoinitiator is about 0.1% to 3.0% by weight of the resin formulation; a thermal inhibitor is about 0.001% to 4% by weight of the resin formulation; and a defoaming agent is about 0.0001% to 0.1% by weight of the resin formulation. Wherein the mixture of low volatility oligomers is combined with the photoinitiator, the thermal inhibitor and the defoaming agent, and mixed, then degassed at a temperature of about 60 deg C. and at a pressure of less than 10 kPa for at least 10 minutes.

31 Claims, 12 Drawing Sheets

*(Resin Formulation)*

A resin formulation comprising:

a mixture of low volatility oligomers is about 40% to 75% weight of the resin formulation;

a plasticizer is about 25% to 55% by weight of the resin formulation;

a photoinitiator is about 0.1% to 3.0% by weight of the resin formulation;

a thermal inhibitor is about 0.001% to 4% by weight of the resin formulation; and a defoaming agent is about 0.0001% to 0.1% by weight of the resin formulation, wherein the mixture of low volatility oligomers is combined with the photoinitiator, the thermal inhibitor and the defoaming agent, and mixed, then degassed at a temperature of about 60 degC and at a pressure of less than 10 kPa for at least 10 minutes.

FIG. 1A

*(Some Steps for Formulating Resin)*

Step 1: Combining:
(a) a mixture of low volatility oligomers is about 40% to 75% weight of the resin formulation;
(b) a plasticizer is about 25% to 55% by weight of the resin formulation;
(c) a photoinitiator is about 0.1% to 3.0% by weight of the resin formulation;
(d) a thermal inhibitor is about 0.001% to 4% by weight of the resin formulation; and
(e) a defoaming agent is about 0.0001% to 0.1% by weight of the resin formulation.

Step 2: Mix (a), (b), (c), (d) and (e)

Step 3: Degas the mixture of step 2 at a temperature of about 60 degC and at a pressure of less than 10 kPa for at least 10 minutes

FIG. 1B

(Some 3D Printing Steps)

(Step 1: Extend)

(Step 2: Position to start printing)

(Step 3: Print)

(Step 4: Mid-printing)

(Step 5: Dish fully printed curing in sun UV-rays)

(Step 6: Reposition to operational state)

(Pair of 160mm f/1 paraboloid reflectors printed in air)

(Test parabolas sprayed with conductive paint and configured with a dipole for gain and focal length testing)

(Gain over a free-space dipole at 10 gHz, 13.5 gHz, and 20 gHz, with all tested with the 22mm (12 GHz) dipole feed.)

ON-ORBIT ADDITIVE MANUFACTURING OF PARABOLIC REFLECTORS VIA SOLAR PHOTOPOLYMERIZATION

FIELD

The present disclosure relates generally to cross-linking a polymeric material including a mixture of low volatility oligomers, a plasticizer, a photoinitiator, a thermal inhibitor and a defoaming agent, that is mixed, then degassed at a temperature of about 60 deg C. and at a pressure of less than 10 kPa for at least 10 minutes, that can be used in shaped articles.

BACKGROUND

Three dimensional (3D) printing is an additive manufacturing process for making three-dimensional objects of arbitrary shapes from digital models; when used for spacecraft these objects are typically made prior to being sent into outer space for use. For example, current antennas for spacecraft such as space probes and communications satellites are generally fabricated on the ground on earth in an as-used configuration in outer space. These antennas must be over engineered to be capable of handling the acceleration and vibrational-acoustic forces of liftoff while contained within a spacecraft rocketed into space. This forces can include 14 Gs (G-forces or gravitational forces) of linear acceleration, 50 Gs of broadband vibration, 138 decibels (dB) of noise level, along with single event shocks of up to 500 Gs (according to Goddard Space Flight Center's testing protocols).

Thus, most conventional antennas, or for that matter any structure, intended for use in space in a spacecraft are much stronger and heavier than would be required for them to perform their primary mission, i.e. being an antenna or structure on a spacecraft in zero-gravity. Also, since spacecraft launch cost and mission capabilities are almost completely dominated by the weight of the spacecraft and the volume consumed within the payload shroud, there is great value in finding ways in making the heavy over engineered antenna lighter.

The conventional alternative of the full-size rigid antenna is to construct the antenna to be foldable on the ground on earth, then after brought to space and during launch; a mechanism such as a motor, pyrotechnic device ("explosive bolt") or thermal expansion motor then releases the folded antenna which then unfolds in orbit to the desired shape. Unfortunately, this makes for a very complicated and delicate unfolding mechanism prone to many problems including jamming, because of the long lever arms and low spring forces required (since there is no viscous damping due to air in a vacuum deployment, the forces must be kept low). As an example of this type of folded antenna is the foldable antenna on the Galileo Jupiter probe, where the antenna was flexible and designed to fold up like an umbrella; however, only 15 out of 18 of the umbrella ribs actually popped free of their retaining cups, keeping the antenna partially folded. This failure greatly impacted the overall data rate of the science data returned from Jupiter, increasing mission costs while expending resources to try and fix the problem; the fix effort was unsuccessful and the mission profile was altered to work with the lower data rates available with the failed antenna. Unfolding of the antenna is only one of many problems with manufacturing a structure on the ground and then sending it to space.

However, placing a large antenna on a satellite is a "conflicted goal". The conflict is between increasing the antenna size to provide improved directionality for operational use, to save transmitter power, and to allow high data rates even in deep space missions, that goal is in conflict with the goal of having a compact and light weight space probe that is robust to the extreme G-forces and vibrations of the rocket launch.

In fact, placing any component on a spacecraft or satellite that could be manufactured in space further adds to the "conflicted goal". Presently, conventional technological manufacturing processes are not equipped to operate in a zero-gravity environment. Space exploration is plagued with many challenges, and figuring out how to manufacture in space is a longstanding challenge that still has yet been addressed. For example, in regard to 3D printing, it was not until recently 3D printing in space has been contemplated, some challenges with 3D printing include extrusion techniques and feedstock compositions. Manufacturing in a zero-gravity environment requires specific technological novelties not yet discovered, so as to allow for robust manufacturing of components in space.

Therefore, a need exists in the technical art for manufacturing components in space, such as manufacturing operational antennas or other structures, components or parts of components, that can further space exploration by developing 3D printing feedstock materials used for manufacturing in a space environment.

SUMMARY

The present disclosure relates to systems and methods for additive manufacturing, and more particularly to 3D printing feedstock material used for fabrication of three-dimensional (3D) objects in orbit by 3D printing. In particular, cross-linking a polymeric material including a mixture of low volatility oligomers, a plasticizer, a photoinitiator, a thermal inhibitor and a defoaming agent, that is mixed, then degassed at a temperature of about 60 deg C. and at a pressure of less than 10 kPa for at least 10 minutes, that can be in shaped articles i.e. the shaped articles include the cross-linked extended polymeric material.

For example, some embodiments of the present disclosure include a resin formulation including: a mixture of low volatility oligomers is about 40% to 75% weight of the resin formulation; a plasticizer is about 25% to 55% by weight of the resin formulation; a photoinitiator is about 0.1% to 3.0% by weight of the resin formulation; a thermal inhibitor is about 0.001% to 4% by weight of the resin formulation; and a defoaming agent is about 0.0001% to 0.1% by weight of the resin formulation. Wherein the mixture of low volatility oligomers is combined with the photoinitiator, the thermal inhibitor and the defoaming agent, and mixed, then degassed at a temperature of about 60 deg C. and at a pressure of less than 10 kPa for at least 10 minutes.

Some embodiments of the present disclosure relate to photopolymer resins for 3D printing or additive manufacturing that can be used in a zero-gravity environment. Wherein the photopolymer resins can be stored in a feedstock associated with a 3D printer and stored on a spacecraft on Earth, then transported into orbit or a space environment by the spacecraft. The photopolymer resins of the present disclosure are formulated to withstand travel from Earth into orbit while retaining 3D printing performance.

Some embodiments of the present disclosure include resins composed of a low-volatility aliphatic urethane acrylate oligomer blend, a photoinitiator, an inhibitor, and a low volatility polyphenol ether oil to act as a plasticizer and to decrease the viscosity of the otherwise grease like oligomer. The polyphenyl ether oil and the cross linked polymers formed from the aliphatic urethane acrylates are chemically compatible and form stable homogenous solid mixtures. More specifically, some of the feedstock include resins that can be formulated toward:

(a) an oligomer-only feedstock composed by weight of 10% of a third oligomer of about 0% to 20% by weight low-volatility aliphatic urethane acrylate oligomer with about nine functional groups and a viscosity of about 180000 cps, wherein the nine functional group oligomer is a clear liquid multifunctional urethane acrylate oligomer;

(b) 10% of a second oligomer of about 0% to 20% by weight low-volatility aliphatic urethane acrylate oligomer with about two functional groups and a viscosity of about 7000 cps, the two functional group oligomer is an aliphatic polyester based urethane diacrylate oligomer;

(c) 40% a first oligomer of about 0 to 100% by weight low-volatility aliphatic urethane acrylate oligomer with about six functional groups and a viscosity of about 3500 cps, wherein the six functional group oligomer is an aliphatic polyester based urethane hexaacrylate oligomer, (all three are aliphatic urethane acrylate oligomers); and (d) 40% of a plasticizer, such that the plasticizer is a vacuum oil with a vapor pressure at 100 deg C. of less than $10^{-4}$ kPa, wherein the vacuum oil is a polyphenyl ether vacuum oil, that is a multi-ring polyphenyl ether,
. . .
. . . giving a resin base feedstock with a viscosity of about 2000 cps.

Another plasticizer may be a vacuum oil with a vapor pressure at 100 deg C. of less than $10^{-4}$ kPa, wherein the vacuum oil is a polyphenyl ether vacuum oil, that alternatively can be a very low volatility vacuum oil that is polyphenyl ether having a five ring polyphenyl ether.

Further, this feedstock's can then have sensitizers and stabilizers added, typically 1% (by weight over the feedstock) BAPO (bis-acylphosphine oxide) as a photoinitiator, and 3% of 4-MP (4-methoxyphenol) as a thermal polymerization inhibitor. Additionally, this feedstock can also have added to it, a very small amount (0.37% by weight) of BYK-088 (a commercially available long-chain alkane mix) as an antifoaming agent to assist in degassing.

By non-limiting example, the justification for the large fraction (40%) of first oligomer can be that the first oligomer is formulated with six functional groups (bondable crosslinking sites), which produce a strong and warp-resistant polymer matrix; this oligomer has an unreacted base viscosity of about 3500 cps (comparable to molasses on a cold day). The second oligomer has two functional groups, and a base viscosity of 7000 cps, while the third oligomer has nine functional groups and a viscosity of 180,000 cps (nearly solid). The plasticizer can be vacuum oil with a viscosity of just 190 cps (comparable to quality spar varnish) and makes the mixing and de-foaming process much more tractable.

Some embodiments can include a final extruder feedstock mixture including the oligomer mix, photoinitiator, inhibitor, and anti-foamer that is then degassed at 5 kPa and 60 deg C. in a vacuum oven for about 15 minutes before loading into the extruder. Wherein, an estimate of the ready-to-extrude material can have a viscosity of roughly 2000 cps at room temperature.

Practical Applications

Embodiments of the present disclosure including resin formulations can be used to create components via 3D printing in zero gravity while on-orbit in a space environment. Astronauts or operators in space may be able to receive digital designs of one or more components from Earth or from some other location via wireless communication, wherein the one or more components can be created via 3D printing from the received digital designs. Some realized benefits of the embodiments of the present disclosure including the resin formulations is that the one or more components created in orbit in the space environment, translate to substantial savings of not having to transport them into space, resulting in a savings in terms of time and costs. Further, having a capability to print parts and tools, or any type of component in 3D via 3D printing on demand increases an overall reliability and safety of space missions.

For example, some of the resins of the present disclosure can be used as feedstock for 3D printers to 3D-print an antenna reflector on-orbit, or some other part or device, where the photosensitive resin(s) polymerizes by crosslinking to a stable heat-resistant solid when exposed to UV. As the antenna is produced on orbit, in microgravity, the antenna does not need to be any more robust than necessary to survive orbit correction maneuvers. Thus, the antenna may be much thinner and lighter than some conventional antennas that must survive the stresses of launch and orbital insertion.

After printing, additional motors may be required for printing, and then become available for adjusting antenna focus, off-axis aiming, and beam pattern squint control, as well as aiming the antenna beam rapidly on orbit by using non-holonomic motions of the printed antenna against the main spacecraft bus. As the antenna specifics are not determined until actual printing, it would be possible to pre-launch spare space vehicles and print the antenna with a specific (and possibly asymmetric) beam pattern on demand, depending on the specific applications.

To verify feasibility of free-form 3D printing of structures with adequate shape control and surface smoothness to be used as spacecraft antennas, a head-and-rain free-form 3D printer was built during experimentation for extruding several candidate resins of the present disclosure. While bathing the 3D printer in UV, and using an early candidate low-volatility resin, we successfully freeform-printed in air and earth gravity a 165 mm (6.5") parabolic antenna with an ~f/1 focal ratio and a measured gain of 28 dB (vs a dipole) in the Ku band (13.5 GHz) with a simple dipole feed. Further resin candidates improved the strength-to-weight ratio by producing a desirable structural foam when extruded under vacuum of ~25 millibar.

According to an embodiment of the present disclosure, a resin formulation includes: a mixture of low volatility oligomers is about 40% to 75% weight of the resin formulation; a plasticizer is about 25% to 55% by weight of the resin formulation; a photoinitiator is about 0.1% to 3.0% by weight of the resin formulation; a thermal inhibitor is about 0.001% to 4% by weight of the resin formulation; and a defoaming agent is about 0.0001% to 0.1% by weight of the resin formulation.

According to another embodiment of the present disclosure, a resin formulation includes: a mixture of low volatility oligomers is about 60% weight of the resin formulation; a plasticizer is about 40% by weight of the resin formulation; a photoinitiator is about 1.0% by weight of the resin formulation; a thermal inhibitor is about 3.0% by weight of the resin formulation; and a defoaming agent is about 0.002% by weight of the resin formulation.

According to another embodiment of the present disclosure, a resin formulation including: about 0.1%-5.0% by weight of a photoinitiator; about 45%-99% by weight of an oligomer or oligomers in combination; about 0%-60% by weight of a vacuum oil; about 0%-5% by weight of a thermal inhibitor; about 0%-1% by weight of a defoaming agent; about 0%-5% by weight of a nonreacting gas, as microbubbles; about 0%-5% by weight of a nonreacting gas, dissolved into solution; about 0%-5% by weight of a particulate material possessing bubble nucleation sites; and about 0%-5% by weight of a semivolatile material subject to microbubble formation when subjected to mechanical or ultrasonic pressure waves.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1A is a block diagram illustrating a resin formulation, according to embodiments of the present disclosure;

FIG. 1B is a block diagram illustrating some steps for formulating a resin, according to embodiments of the present disclosure;

Figure 2A:
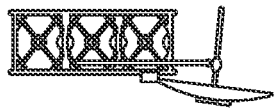
FIGS. 2A through FIG. 2F are schematics illustrating a freeform 3D printing sequence of a parabolic antenna, according to embodiments of the present disclosure.
Figure 2B:
Figure 2C:
Figure 2D:
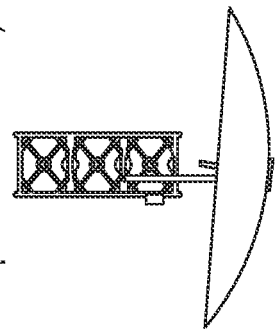
Figure 2E:
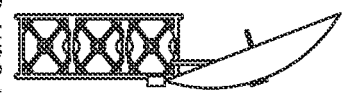

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

FIG. 1A is a block diagram illustrating a resin formulation, according to embodiments of the present disclosure. For example, the resin formulation can be used as 3D printing feedstock material for fabricating three-dimensional (3D) objects in orbit via a 3D printer. In particular, the resin formulation can include cross-linking a polymeric material having a mixture of low volatility oligomers, a plasticizer, a photoinitiator, a thermal inhibitor and a defoaming agent, that is mixed, then degassed at a temperature of about 60 deg C. and at a pressure of less than 10 kPa for at least 10 minutes, which can be in shaped articles i.e. the shaped articles including the cross-linked extended polymeric material.

As illustrated in FIG. 1A, some embodiments of the present disclosure include a resin formulation having: a mixture of low volatility oligomers is about 40% to 75% weight of the resin formulation; a plasticizer is about 25% to 55% by weight of the resin formulation; a photoinitiator is about 0.1% to 3.0% by weight of the resin formulation; a thermal inhibitor is about 0.001% to 4% by weight of the resin formulation; and a defoaming agent is about 0.0001% to 0.1% by weight of the resin formulation.

FIG. 1B is a block diagram illustrating some steps for formulating a resin, according to embodiments of the present disclosure. For example, step 1 of FIG. 1B includes the mixture of low volatility oligomers (a) that is combined with the plasticizer (b), the photoinitiator (c), the thermal inhibitor (d) and the defoaming agent (e).

Step 2 of FIG. 1B includes mixing the mixture of low volatility oligomers (a), the plasticizer (b), the photoinitiator (c), the thermal inhibitor (d) and the defoaming agent (e).

Step 3 of FIG. 1B includes degassing the mixture of step 2 at a temperature of about 60 deg C. and at a pressure of less than 10 kPa for at least 10 minutes.

Referring to FIG. 1A and FIG. 1B, the photopolymer resins of the present disclosure can be used as feedstock for 3D printing or for some other additive manufacturing process used in a zero-gravity environment. These photopolymer resins of the present disclosure are formulated to withstand travel from Earth into orbit without limiting 3D printing performance in the zero-gravity. Some of these photopolymer resins can be composed of a low-volatility aliphatic urethane acrylate oligomer blend, a photoinitiator, an inhibitor, and a low volatility polyphenol ether oil to act as a plasticizer and to decrease the viscosity of the otherwise grease like oligomer. The polyphenyl ether oil and the cross linked polymers formed from the aliphatic urethane acrylates are chemically compatible and form stable homogenous solid mixtures. More specifically, some of the feedstock include resins that can be formulated toward: (1) an oligomer-only feedstock composed by weight of 10% of a third oligomer of about 0% to 20% by weight low-volatility aliphatic urethane acrylate oligomer with about nine functional groups and a viscosity of about 180000 cps, wherein the nine functional group oligomer is a clear liquid multifunctional urethane acrylate oligomer; (2) 10% of a second oligomer of about 0% to 20% by weight low-volatility aliphatic urethane acrylate oligomer with about two functional groups and a viscosity of about 7000 cps, the two functional group oligomer is an aliphatic polyester based urethane diacrylate oligomer; (3) 40% a first oligomer of about 0 to 100% by weight low-volatility aliphatic urethane acrylate oligomer with about six functional groups and a viscosity of about 3500 cps, wherein the six functional group oligomer is an aliphatic polyester based urethane hexaacrylate oligomer, (all three are aliphatic urethane acrylate oligomers); and (4) 40% of a plasticizer, such that the plasticizer is a vacuum oil with a vapor pressure at 100 deg C. of less than 10^-4 kPa, wherein the vacuum oil is a polyphenyl ether vacuum oil, that is a multi-ring polyphenyl ether, giving a resin base feedstock with a viscosity of about 2000 cps. Another plasticizer may be a vacuum oil with a vapor pressure at 100 deg C. of less than 10^-4 kPa, wherein the vacuum oil is a polyphenyl ether vacuum oil, that alternatively can be a very low volatility vacuum oil that is polyphenyl ether having a five ring polyphenyl ether.

Still referring to FIG. 1A and FIG. 1B, these feedstock's can then have sensitizers and stabilizers added, typically 1% (by weight over the feedstock) BAPO (bis-acylphosphine oxide) as a photoinitiator, and 3% of 4-MP (4-methoxyphenol) as a thermal polymerization inhibitor. Additionally, this feedstock can also have added to it, a very small amount (0.37% by weight) of BYK-088 (a commercially available long-chain alkane mix containing a solution of foam-destroying polymers and polysiloxanes) as an antifoaming agent to assist in degassing.

Experimentation

FIGS. 2A to FIG. 2F are schematics illustrating a freeform 3D printing sequence of a parabolic antenna, according to embodiments of the present disclosure. For example, FIGS. 2A to FIG. 2F represent a freeform 3D print, that starts with a minimal hub mounted on the spin motor via FIG. 2A, and progressively the 3D printing sequentially continues, FIG. 2B, FIG. 2C, FIG. 2D, working outward to FIG. 2F that includes repositioning the antenna paraboloid to an operational state. The printed being printed antenna paraboloid could be a 3U or 6U CubeSat. Wherein the extruder nozzle can be a small rectangle on a lower left of a spacecraft bus, by non-limiting example.

Identifying Some Problems With Conventional Methods

Several aspects were considered before beginning experimentation in order to achieve the best possible results for creating resin formulations according to the present disclosure. For example, an initial analysis of some conventional space methods were reviewed, including the current conventional satellite antennas deployed to orbit at full size, or spring/motor actuated antennas that unfold once in orbit. Some aspects learned is that these full-size conventional antennas take a lot of space in the spacecraft, while unfolding conventional antennas are mechanically complicated and prone to failure. Both conventional antenna types must be made strong enough to withstand launch (5-10 G linear acceleration, and up to 50 G of broadband vibration), which means the conventional antennas are tremendously over built for actual use in space in order to be transported from Earth to space.

Still referring to FIG. 2A to FIG. 2F, some major problems with these conventional antennas include their physical dimensions and stowage limitations, such that small satellites (SmallSats) do not currently have the ability to deploy large high-gain antennas. High gain antennas are especially useful on SmallSats due to the low transmitter power availability. However, with the advent of new launch opportunities, proposals for satellite constellations numbering in the thousands, and decreasing size and power consumption of on-board electronics, SmallSats are becoming commonplace. With their new popularity, increasing attention is now being paid to overcoming the aforementioned conventional limits in communication ability. Cube satellites (CubeSats), weighing between 1 and 10 kg, are particularly of interest for today's space technology industry.

Some Aspects Learned after Reviewing Conventional Space Methods

Certainly, conventional space methods teach that launching into space any high-gain antenna, folded, deflated, or otherwise, that is compromised to fit into the spacecraft envelope or payload shroud, is not a solution to today's technology needs in the Space Industry. However, gained from reviewing some conventional space methods, is that the Space Industry can benefit tremendously by 3D printing of parts, parts of components and components in space or on orbit, on an on demand basis, including reducing costs and safety of space missions.

Still referring to FIG. 2A to FIG. 2F, for example, the resin formulations of the present disclosure can be launched from Earth into space, as a tank of liquid resin 3D printer feedstock, which is dimensionally small, conformable, and totally immune to vibration and shocks, among other aspects associated with launching objects into space via a spacecraft. By non-limiting example, an antenna can be 3D-printed after the satellite or spacecraft reaches orbit, and where all future stresses are low. Further, the antenna shape (which controls beam shape and focus) is not constrained to fit inside the launch vehicle, doesn't need to be foldable, and does not need strong support structures to survive launch as required by conventional antennas. The resin formulations of the present disclosure are actually lower-mass than other conventional space antennas alternatives. Another benefit of using the resins formulated by the present disclosure is that motors used during on-orbit 3D printing can continue to be used after fabrication to aim the antenna beam rapidly during the mission by using non-holonomic motions of the printed antenna's inertial mass against the main spacecraft bus. Because the shortest usable wavelength of the reflector is inversely proportional to the surface roughness, the submillimeter-level smoothness of a 3D printed reflector allows much higher frequency operation. The system can be further lighten by using the Sun as a UV source to supply the polymerization energy required to cure the resin, thus eliminating the further need for launching and powering the UV polymerization source in space.

Thus, experimentation can be based on defining a minimum feasible system to demonstrate feasibility of a specialized on-orbit antenna 3D-printer including:

Printer operates in the orbital space environment;

Can print and deploy a working communication antenna in a desired communication band; and Operate with a limited power available to a small satellite, where the resulting structure can retain integrity when in radiation, vacuum and temperature extremes due to the harsh environment of space.

Figure 2F:
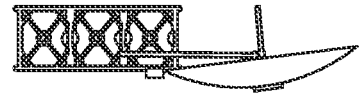

Still referring to FIG. 2A to FIG. 2F, the resin formulations of the present disclosure can be launched from Earth into space, as a tank of liquid resin 3D printer feedstock, and used to perform a freeform 3D print. As noted above, FIG. 2A starts with a minimal hub mounted on a spin motor, and progressively works outward as shown in FIG. 2B, FIG. 2C, FIG. 2D and FIG. 2E, showing progression of an antenna paraboloid being printed on a 3U or 6U CubeSat. Finally, FIG. 2F shows the antenna paraboloid complete and includes repositioning the antenna paraboloid to an operational state. The extruder nozzle used to extrude the resin formulations can be a small rectangle on a lower left of a spacecraft bus.

Comparison of Resin Mass at Launch Vs Full Complete Antenna Mass

In order to substantial usefulness of a novel approach of additive manufacturing in space, in-space fabrication must not just be technically feasible, but needs to also be economically feasible. In the case of small ComSats, that means in-space fabrication has to work well enough and be lower mass at launch than the current technology that fits full complete antennas or folding antennas, or the like, into a confined space within the satellite or spacecraft.

Still referring to FIG. 2A to FIG. 2F, for a first-order test case, consider the conventional Cassini probe's large fixed parabolic high gain antenna (a large conventional antenna, but one with abundant publicly available information), Cassini's conventional dish was 4 meters in diameter, and weighed 105 Kg. The conventional dish was driven at three wavelengths—14 cm (S band), 4 cm (X band, about 6 GHz), and 1 cm (Ka band, about 25 GHz), meaning the surface geometric accuracy had to be within 3.5 cm, 1 cm and 0.25 cm respectively. In contrast, an equivalent 3D printed dish, 4 meters in diameter, 50 mm thick, would have a volume of 0.64 $m^3$, and if constructed monolithically from a two-part urethane foam (32 $Kg/m^3$), would weigh only 20 Kg, whereas the Cassini's conventional dish weighed 105 Kg. In other words, a roughly equivalent 3D printed dish weighs about 80% less than the Cassini's conventional dish.

However, the weight of the 3D freeform printer also needs to be accounted for to construct the antenna disk on orbit. Based on experimentation an estimate of an empty tank with an inside bladder, pressurizer, metering valves, nozzle, sunlight shutter, extendable ram, tilt and spin motors, metallizer, and electronics would weigh on an order of 25 to 30 Kg, with a volume on an order of 40 to 50 liters. This translates to a 2× savings in launch mass, a considerably smaller payload shroud, and adds a substantial benefit of non-holonomic spacecraft attitude control without propellant use. When if one is going to launch on an order of a hundred near-identical smallSats in one launch event (with the anticipation that 10% of them fail to correctly print their antennas), but the lower mass and payload shroud volume savings allowed an additional twenty smallSats to be launched (20% increase in satellite number), overall the printed antenna becomes a statistical winning bet. The freeform 3D printed antenna may also have much lower initial cost compared to an intricate mechanical folding antenna of similar aperture and surface figure quality.

Extra Motors can be Useful

Still referring to FIG. 2A to FIG. 2F, at least one aspect can be that for a full 3D manufacturing capability at least 3 positioning actuators may be needed. It is possible to reduce the actuation requirement to 2 motors for a limited subset of simple geometries (for example, having the spin motor also operate the extension ram screw or winch) or even a single motor (directly driving the spin motor, geared down for the ram screw, and having tilt angle generated passively by a cam riding on the ram extension. Furthermore, it should be noted that the microgravity environment enables utilization of much smaller and lighter motors as compared to ground-based units, and that during the high G-loads at launch the motors and motor support structures are only carrying their own mass, not the mass of the entire antenna dish.

One might continue to consider that the extrusion rain, rain motor, spin motor, and off-angle motor are wasted mass once the antenna element has been completed, however, they maintain usefulness for the duration of the mission. Extending/retracting the rain will change the system RF focus and spot size. The off-angle motor, initially used to sculpt the paraboloid's curve, later allows off-axis feed points or slewing the beam without using propellant. The spin motor can likewise slew the spacecraft (using the mass of the antenna as a reaction wheel), or, in the case of an intentionally-asymmetric reflector, can rotate the beam pattern to match the on-ground footprint of the desired service area.

Still referring to FIG. 2A to FIG. 2F, because the constructed element using the resin formulation of the present disclosure is truly freeform, arbitrary antenna patterns can be constructed. For example, paraboloids are merely a good (and broadband) example of the antenna element. Diffractive elements are as easy to construct as reflective elements and may have a better launch mass to gain ratio, and require no metallization. The same constructed element using the resin formulation of the present disclosure may act as a wide-pattern antenna on S-band and a narrow pencil-beam at 15 GHz and with different beam axes, by proper design.

Because vacuum deposition of metal onto plastic is an established and heavily commercialized technology dating from the 1930's (consider the vacuum deposition of sodium and potassium "getter" on the inside surfaces of a 1930's vacuum tube), this aspect is not further experimented with regarding this proof of concept.

Experimental Hardware

Test Extruder

Figure 3:
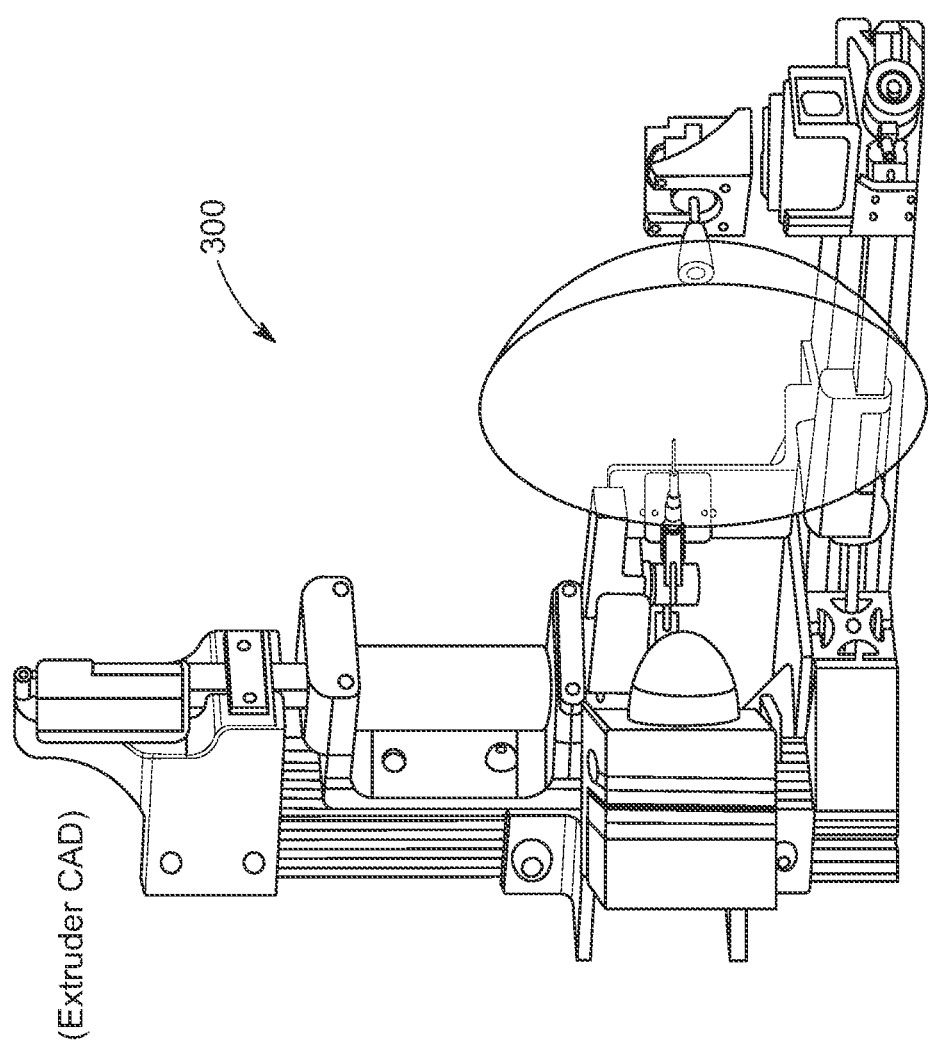
FIG. 3 is a schematic illustrating an extruder CAD Model, according to embodiments of the present disclosure.

FIG. 3 is a schematic illustrating an extruder CAD Model, according to embodiments of the present disclosure. FIG. 3 an example of a test CAD model of an extruder 300, used to test the freeform 3D printability required for on-orbit fabrication of antenna structures. The test CAD model of the extruder 300 is designed and constructed as an Arduino-controlled freeform extruder that could fit into an experimental 500 mm spherical vacuum chamber.

Unlike a standard consumer 3D printer with three orthogonal linear translating axes, the test extruder is designed to adhere as closely as possible to the CubeSat-compatible design shown in FIG. 2A to FIG. 2F, including the multi-purpose motors. The test extruder can include a single linear rain, (later to be used to adjust beam focus on orbit), and two rotary axes, (one later to become the RF feed off-axis angle (squint) control; the other motor rotates the paraboloid relative to the CubeSat for printing, and later would allow alignment of an ellipsoidal or other asymmetric beam pattern onto ground sites without altering beam polarization.)

Still referring to FIG. 3, a separate resin delivery system can use the second linear rain to drive a piston in a large reservoir of viscous resin maintaining an elevated pressure relative to the local environment (room air or vacuum) via a differential pressure sensor and a bang-bang controller. Actual resin deposition can be controlled by an electromagnetic pinch valve which pinches the silicone feed tube shut. The combination of tank pressure and rapid cyclic opening of pinched tube allow the desired flow rate to exit via a pliable 1.7 mm ID nozzle. The high viscosity of the resin creates a sufficient retarding force to prevent rapid depressurization at a short timescale the valve remains open. The immediate exposure to high dose of UV radiation causes rapid polymerization with minimal influence of the vacuum environment. The extrusion speed, resin composition and UV power are key factor necessary to fine-tuning the polymerization response upon exiting the nozzle. It was possible to achieve a repetitive, successful attachment onto the edge of the partially fabricated antenna reflector, where the UV light polymerizes it within a few seconds into rigid antenna material. Note, that modifications can be made to the system depending upon a user's specific application requirements, which is determined as a case by case basis.

The entire system can be controlled by two Arduino base control systems; one outside the vacuum chamber operating a display and an operator manual controls, the other inside the chamber, directly controlling the motion and resin deposition systems apparatus. The communication between microcontrollers is based on a bidirectional serial optical link through the clear vacuum chamber wall. Power at 24 VDC is supplied into the vacuum chamber via two copper foil lead through laid across the silicone chamber gasket and heavily greased. Vacuum is produced by a Harbor Freight two-stage piston vacuum pump, and the pump exhaust is fed directly to a rooftop exhaust equipped with a large (500 watt) fan producing negative pressure on the entire in-building air path, to assure experimenter safety in case of unexpected outgassing of any unanticipated by-products, as well as safe extraction of any oil fog from the vacuum pump itself.

Still referring to FIG. 3, after loading the mixed and degassed feedstock resin into the resin reservoir, the system is switched to a semi-autonomous mode. The internal Arduino is then in control; the outside Arduino can read reservoir pressure, paraboloid rotation rate, feed-angle (squint) rate, rain rate, and pinch valve duty cycle, and can write the set points for those parameters, while the inside Arduino performs the actual controlling, stepping, and PWMing to achieve those set points. We have used this system, with minor alterations, to produce testable 3D freeform antenna structures in both air and low quality (~5 kPa) vacuum.

Photopolymerizable Resins

There are several constraints on the resin formulation mix. Obviously, the resin formulation must polymerize on exposure to bright light; chemical kinetics and ease-of-use criteria usually drive preference to intense exposure to deep blue and ultraviolet light (<405 nm wavelength). Equally important but less obviously, is that the resin formulation must *not* polymerize under any other condition, including heat, cold, shock, low level ionizing radiation, residual catalysts from plastic tubing or fittings, or surface ions contamination from metal parts in the extruder fluid handling path.

Table 1 below is a summary of the experimental determination of material compatibility for a custom resin according to some embodiments of the present disclosure.

| Silicone Tubing | safe |
| Latex Tubing | clogs |
| Nylon Barb Fittings | clogs |
| Polypropylene Barb Fittings | safe |
| Polycarbonate Barb Fittings | safe |
| Polyethylene Barb Fittings | clogs |
| Polyethylene Syringes | safe |
| Stainless Steel 304 | safe for days, not weeks |
| Teflon-coated Stainless | safe |
| Neoprene Rubber | safe |

Protecting the uncured resin in the storage and delivery system from UV exposure is a high priority. The summary of compatible material choices is presented in Table 1, above. None of the tested materials, except the stainless steel, resulted in blocking UV radiation, therefore a metal foil shielding has been used whenever UV source has been in operation.

Tested Resins

For initial feasibility experimental testing, an inexpensive consumer-grade premixed feedstock resin is used, FormLabs Clear Version 4. This resin has a moderate vapor pressure due to dissolved oxygen, making the resin foam wildly at low (<50) millibars pressure. But for testing overall concepts in air and 1 G local gravity, the resin provided an easy starting point that could be test-verified in FormLabs printer used during experimentation, as to UV sensitivity and physical properties such as strength and yield point, verifying that the extrusion and polymerization process were within reasonable bounds for at least one resin formulation of the present disclosure.

During experimentation there were several atmospheric-pressure successes using this resin to free-form fabricate test articles for RF gain measurement (see results below).

However, when degassed to a post-foaming stable pressure <20 millibars, the FormLabs Clear V4 becomes extremely susceptible to thermal polymerization and becomes highly photosensitive to extremely rapid photopolymerization, hardening before the resin could bridge the 1-2 mm gap between the extruder nozzle and the initial spindle base. Based on this reaction, it is surmise that this is due to degassing removing dissolved oxygen, and this lack of oxygen blocking the thermal inhibitors utilized in this consumer-grade product. Molecular oxygen, usually present through diffusion from earth's atmosphere, is a necessary adjunct for many polymerization inhibitors to function. The exposure to pressures under 20 millibars removes this dissolved oxygen, hence suppressing inhibitor action and causing the hyperactivity of polymerization initiators.

As the actual formulation of the FormLabs resin is proprietary it is not possible to further investigate this material. We then proceeded to research resin formulations of extruder feedstock specific to the embodiments of the present disclosure.

Some challenges that had to be overcome to formulate a resin to be used for 3D printing in zero-gravity in orbit or a space environment included not having gravity hold layers together during printing before the layer's cool. One experimental concept tested included using a material that was sticky during printing, so that the stickiness between the layer's cab could keep the layers for the 3D object together. However, some problems were discovered during this experimentation that having layers sticky resulted in the layers sticking to build plates, which caused damage the object being manufactured and in some instances the 3D printer.

Custom Resins

Based on current research of resin formulations from experimentation, some resin formulation is composed of a low-volatility aliphatic urethane acrylate oligomer blend, a photo-initiator, an inhibitor, and a low volatility polyphenol ether oil to act as a plasticizer and to decrease the viscosity of the otherwise grease like oligomer. The polyphenyl ether oil and the cross linked polymers formed from the aliphatic urethane acrylates are chemically compatible and form stable homogenous solid mixtures.

More specifically, we have converged toward an oligomer-only feedstock composed by weight of:
- (a) 10% of the third oligomer;
- (b) 10% of the second oligomer;
- (c) 40% first oligomer (all three are aliphatic urethane acrylate oligomers);
- (d) 40% of the plasticizer, ... giving a resin base feedstock with a viscosity of about 2000 cps.

To this feedstock we then add sensitizers and stabilizers, typically 1% (by weight over the feedstock) BAPO (bis-acylphosphine oxide) as a photoinitiator, and 3% of 4-MP (4-methoxyphenol) as a thermal polymerization inhibitor. Additionally, we add a very small amount (0.37% by weight) of BYK-088 (a commercially available long-chain alkane mix) as an antifoaming agent to assist in degassing.

By non-limiting example, the justification for the large fraction (40%) of first oligomer can be that the first oligomer is formulated with six functional groups (bondable cross-linking sites), which produce a strong and warp-resistant polymer matrix; this oligomer has an unreacted base viscosity of about 3500 cps (comparable to molasses on a cold day). The second oligomer has two functional groups, and a base viscosity of 7000 cps, while the third oligomer has nine functional groups and a viscosity of 180,000 cps (nearly solid). The plasticizer can be vacuum oil with a viscosity of just 190 cps (comparable to quality spar varnish) and makes the mixing and de-foaming process much more tractable. The final extruder feedstock mixture, including the oligomer mix, photoinitiator, inhibitor, and anti-foamer can be then degassed at 5 kPa and 60 deg C. in a vacuum oven for 15 minutes before loading into our extruder. We estimate that the ready-to-extrude material has a viscosity of roughly 2000 cps at room temperature.

To further reduce viscosity, we tested a mix of the first oligomer 60% (3500 cps) with plasticizer 40% (190 cps) but found that toughness suffered; samples were brittle, rather than tough and strong; our qualitative observation is that too much crosslinking can be as bad as too little, even in the presence of large (40%) plasticizer fractions. Increasing the plasticizer fraction from 40% to 60% (with straight 40% of the first oligomer, none of the third oligomer or the second oligomer polymerized to samples with an oily surface as the plasticizer was no longer fully contained in the polymer matrix.

Experiments in Air

Many of our preliminary experiments have been performed at room temperature and pressure. This allowed us to verify a best case surface figure of a 3D freeform printed object, speed of printing, and any other factors, given that a hypothetical "perfect" extruder feedstock existed.

Given the constraints of our extruder (more specifically, that it had to fit inside a ½-meter spherical vacuum chamber) and the size of our resin reservoir, the largest possible paraboloid we can currently produce is about 165 mm (or 6.5 inches) in diameter. We successfully and repeatably fabricated parabolas in this diameter, typically with a nominal f/1 aperture ratio (that is, nominally a 160-170 mm focal length). The process is partially automated; the software keeps the proper angle and rain offset correct so that the extrusion is an accurate paraboloid, closes the loop on the resin reservoir pressure, varies the spin rate to achieve constant rim linear speed, and maintains the desired resin flow rate via the pinch valve. The human operator supervises the printing process, modifying the set points for rotation speed, extruder pressure, pinch valve PWM duration, rotation rate, and rain extrusion rate, to correct for a variation in viscosity or polymerization time encountered.

Figure 4A:
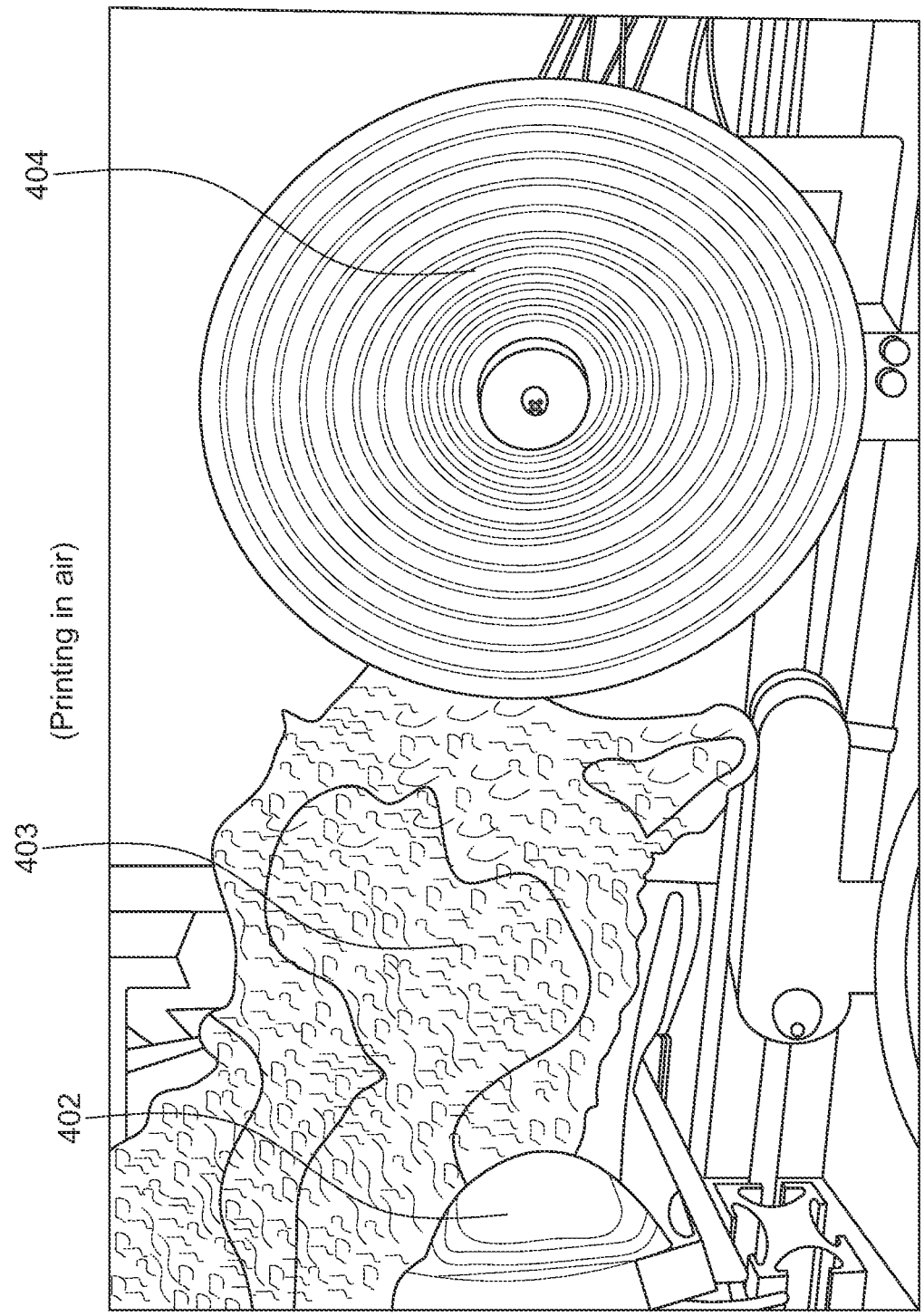
FIG. 4A is a photograph illustrating a 3D printer covered in aluminum foil printing an antenna in air, according to embodiments of the present disclosure.

FIG. 4A is a photograph illustrating a 3D printer covered in aluminum foil 403 printing an antenna 404 in air, according to embodiments of the present disclosure. In particular, FIG. 4A shows the 3D freeform printer 403 printing in air of a 160 mm f/1 paraboloid 404 using FormLabs Clear resin, at atmosphere pressure. The polymerization energy UV source 402 is an LED array, outputting a nominal 405 nm beam; at the ranges used, this UV source delivered about 5 milliwatts/cm$^2$ (0.5 watts/m$^2$, so eye protection is mandatory) at the polymerization zone, as measured by a ThorLabs PM100A photometer with an S401C broadband bolometer sensor. As configured, polymerization took about 1-3 seconds.

Fabrication of F/1 Paraboloids

Figure 4B:
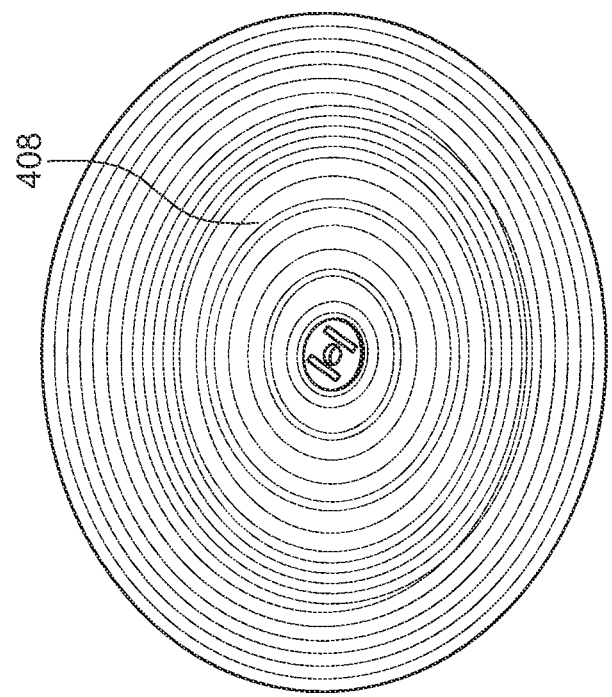
FIG. 4B is a photograph illustrating a paraboloid reflector printed in air without a spray-on conductive coating, according to embodiments of the present disclosure.

FIG. 4B is a photograph illustrating a paraboloid reflector printed in air without a spray-on conductive coating, according to embodiments of the present disclosure. Further, FIG. 4C is a photograph illustrating a paraboloid reflector printed in air with a spray-on conductive coating for RF performance, according to embodiments of the present disclosure.

Figure 4C:
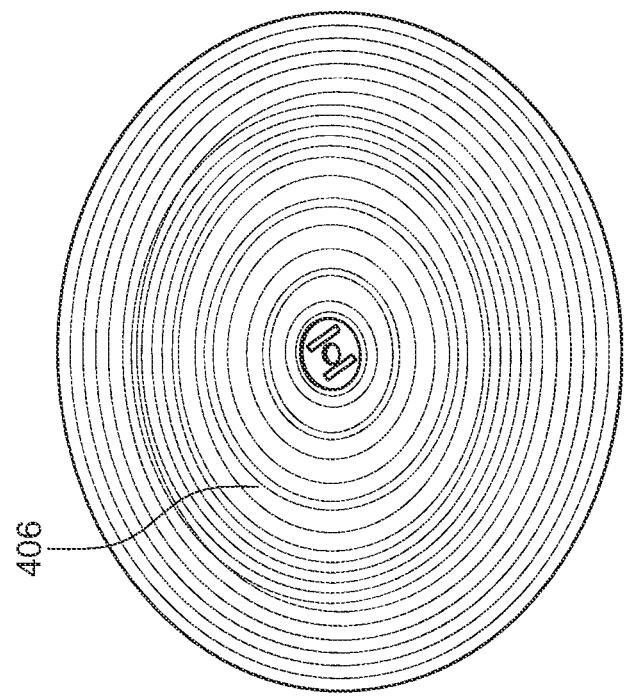
FIG. 4C is a photograph illustrating a paraboloid reflector printed in air with a spray-on conductive coating for RF performance, according to embodiments of the present disclosure.

Referring to FIG. 4B and FIG. 4C, the pair of f/1 paraboloid reflectors are 160 mm diameter by about 1.75 mm thick fabricated at room conditions, both paraboloids are printed using FormLabs Clear V4 resin. FIG. 4C is additionally coated with a conductive coating (spray-on Super-Shield, from MG Chemicals) for RF testing. The FIG. 4C coated paraboloid weighs 37.1 grains while the FIG. 4B uncoated paraboloid weighs 34.0 grams. Note, that in a real system, thermally vaporized vacuum metallization with aluminum or gold would be greatly preferred over commercial spray-on metallization preparations.

RF Characterization

Figure 5:
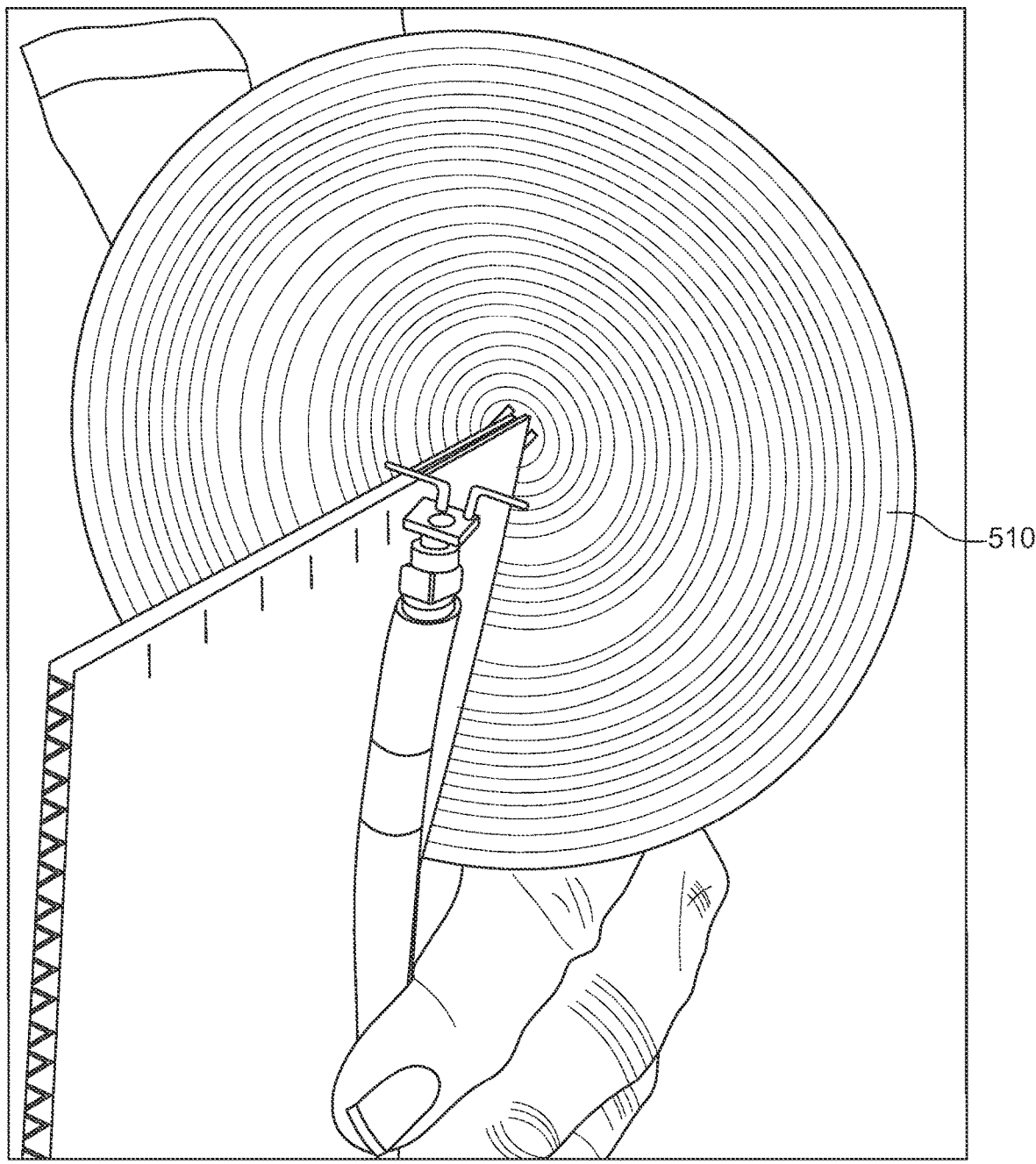
FIG. 5 is a photograph illustrating a paraboloid reflector printed in air with a spray-on conductive coating for RF performance, configured with a dipole for gain and focal length testing, according to embodiments of the present disclosure.

FIG. 5 is a photograph illustrating a paraboloid reflector printed in air with a spray-on conductive coating for RF performance, configured with a dipole and RF feedline for gain and focal length testing, according to embodiments of the present disclosure. Gain and side lobe size is of paramount importance for any directional antenna, so we experimentally verified one of the produced test articles with an Agilent M5230A two-port network analyzer and a pair of self-made 22 mm dipole antennas with a nominal self-resonance at 12 GHz.

Lacking an anechoic RF test chamber for experimentation, approximate measurements were made in an open unobstructed lab area, alternating between bare dipoles (establishing a path loss baseline) and with one dipole equipped with the test paraboloid (the other dipole remained bare). We tested roughly every five degrees in azimuth, from −90 to +90 degrees, at 10, 13.5, and 20 GHz.

Figure 6:
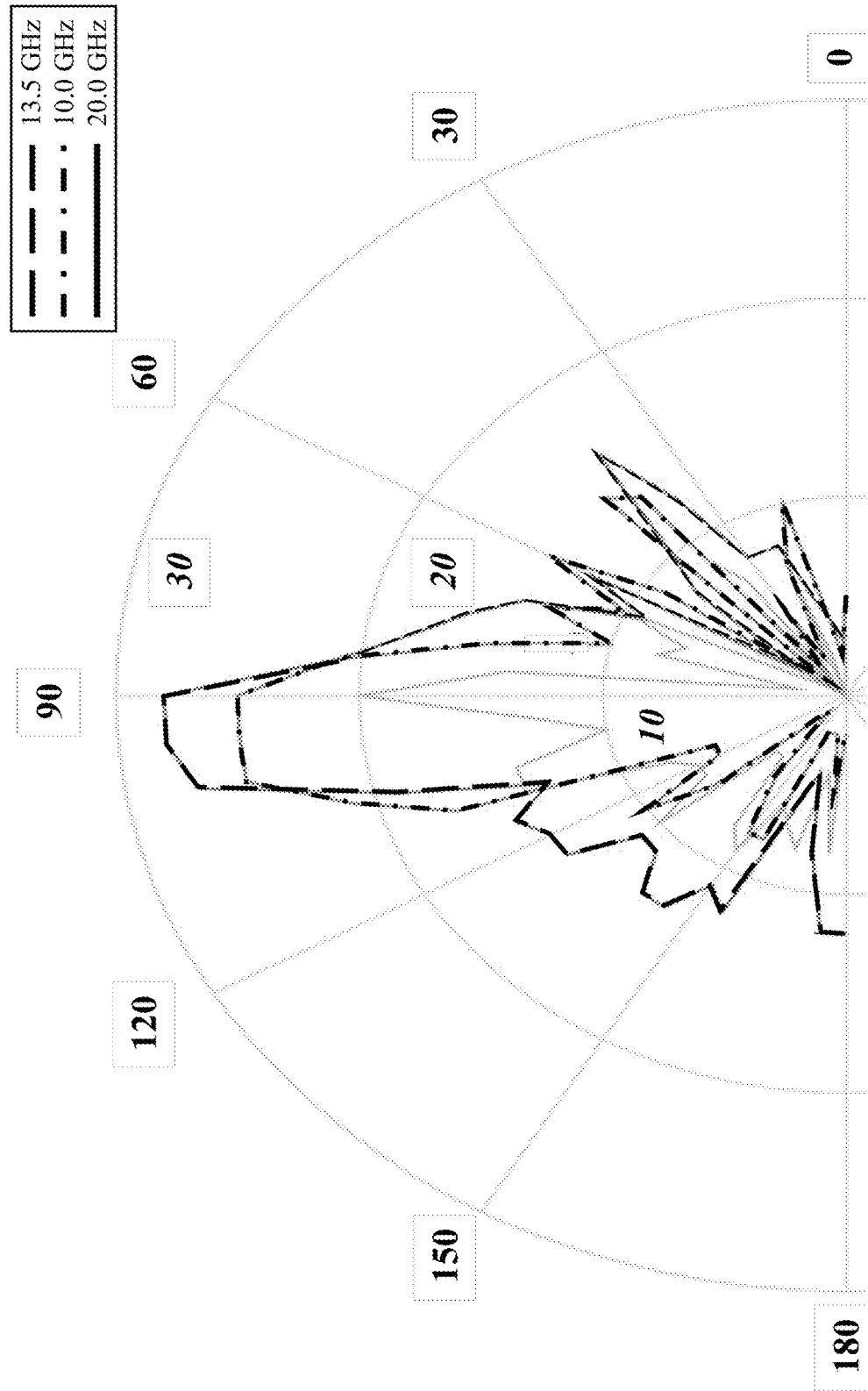
FIG. 6 is a graph illustrating a gain over a free-space dipole at 10 gHz, 13.5 gHz, and 20 gHz, with all tested with a 22 mm (12 GHz) dipole feed, according to embodiments of the present disclosure.

FIG. 6 is a graph illustrating a gain over a free-space dipole at 10 gHz, 13.5 gHz, and 20 gHz, with all tested with a 22 mm (12 GHz) dipole feed, according to embodiments of the present disclosure. Side lobes were generally 12 dB below the main lobe gain, and slightly asymmetric in ways we only partially understand.

As the feed was a simple unshielded dipole, these gain numbers are clearly suboptimal compared to a feed point that would actually be used in a proper CubeSat implementation. The unshielded dipole RF feed radiates in an equatorial torus pattern with nulls along the wire axis at the 12 GHz self-resonant frequency (other radiation patterns appear at other wave-lengths) so at best, about $\frac{2}{3}$ of the testing energy radiated from the dipole misses the paraboloid completely and contributes nothing to gain. Replacing the unshielded dipole with a directional (but still wideband)

horn feed at the focal point should gain 4 to 5 dB with no other system changes. The seemingly-weak performance at 20 GHz is explainable by the primitive dipole feed point; for a constant length dipole, increasing the drive frequency past the resonant frequency causes the dipole's equatorial radiation lobe to become even less directional, putting more energy toward the near-polar axis. This cuts the available energy in the region that the paraboloid can capture and focus.

The surface roughness is probably not a limiting factor in beam quality. Measurement of a test paraboloid on the convex surface (the metallized surface) showed worst-case deviations on the order of +/−250 microns; assuming 250 microns as the surface deviation of a λ/4 diffraction limited reflector indicates the reflector surface quality is adequate to focus wavelengths as short as 1 mm (that is, about 300 GHz). We cannot verify this as our test equipment cannot reach those frequencies so we emphasize that this is purely hypothesis.

Experiments in Vacuum

As noted above, using a consumer grade resin while under vacuum did not produce satisfactory results due to outgassing, causing failure of the oxygen dependent polymerization inhibitor due to very low oxygen concentrations. Switching to a custom low-volatility mixture (described above) allowed us to effectively print at far lower (but not proven in a space environment) pressures.

Also experimented with is a pair of 60 mm paraboloids printed in the above low-volatility resin. Approximately 40 mL of low volatility resin was given a final degassing at about 5 kPa, then vacuum-loaded via siphon action into the extruder. A fresh hub was placed on the rain, and the first (transparent) 60 mm paraboloid printed with the vacuum chamber open to room air.

This first transparent printed paraboloid was replaced with a fresh hub, the rain and skew angle reset, and the vacuum chamber closed and evacuated down to 5 kPa; and some resin test-flowed. A thin line of extremely fine bubbles appeared in the short tube between the PWMed pinch valve and the nozzle, but we considered them insignificant at that time. We re-pressurized the vacuum chamber, shielded the extruder with aluminum foil, and pumped it back down to 5 kPa. We then proceeded to print the second 60 mm paraboloid at an ambient pressure of about 5 kPa using the remaining resin load; as we changed nothing but the ambient printing pressure this allows for a directly comparable materials test.

The fine bubbles persisted, but only in the line downstream of the PWMed pinch valve; the bubbles did not interfere with the print. We terminated this second print due to exhaustion of the resin reservoir; interestingly as the reservoir emptied, the closed-loop pressure control ran out of authority, the delivery line pressure fell, and the pinch-value PWM was set fully open. At this point the creation of the fine bubbles ceased and the final printed layer of the second (whitish) paraboloid were produced clear and bubble free.

We found it interesting that the fine-grained foam produced a paraboloid with less mass and greater stiffness than the first (atmospheric pressure) paraboloid. This experiment confirmed that foaming can be a valid optional method to further enhance the usefulness of this style of on-orbit fabrication.

In fact, it may be desirable to intentionally introduce controlled amounts of a foaming agent into the viscous resin, either premixed on the ground before launch or added during extrusion to further modify the properties of the polymerized material. As noted by Kizito et al., sufficiently small gas bubbles (on an order of tens of microns across) embedded in a viscous liquid exposed to space-level vacuums do not expand without bound as the ideal gas law initially suggests, but are opposed by the surface tension of the bubble's fluid interface, and reach an equilibrium size within a few seconds, at low but non-space like interior pressures (i.e. in silicone oil, for a 30 micron air bubble introduced at 50 Kpa, the measured stable size is 185 microns at a calculated 0.21 Kpa interior pressure, even when the silicone oil itself is at a space-grade vacuum). Air is certainly convenient for such microbubbles, but other gasses (nitrogen, argon, carbon dioxide, helium, methane, ethane, ethylene, propane, propene, cyclopropane, chloromethane, dichloromethane, fluoromethane, difluoromethane, trifluoromethane, or tetrafluoromethane, etc.) may be used.

As it is possible that the gasses themselves may completely dissolve in the viscous resin before launch, it may be desirable to introduce a fine particulate into the viscous resin to provide an abundance of nucleation sites for microbubble production when the viscous resin is exposed to space vacuum. Many materials will work, among them short carbon fiber (with a fiber length less than 10% of the extrusion orifice size, to prevent clogging), carbon nanotubes, finely ground silica (or the vapor-produced equivalent, fumed silica), glass or silica micro-balloons, either whole or intentionally ground or fragmented. The particle size must be controlled to be preferably less than 10% of the minimum orifice size in the resin pathway to prevent clogging.

Finally, as the vibrating pinch valve creating microbubbles demonstrated, it may be useful to include dissolved semivolatile materials in the low volatility viscous resin so that a mechanical pressure transducer such as a vibrating valve or ultrasonic transducer can intentionally create microbubbles in the flowing resin on demand during extrusion. In our experiments, the alkane defoamer mix supplied a source of semivolatile material for the generation of microbubbles. There is no reason to suspect that an alkane in particular is required; the induction of microbubbles by application of pressure wave cavitation is well documented in fluids as diverse as water and mercury, and commonly used in inexpensive ultrasonic cleaning devices.

The documented above experimentation demonstrated proof of concept of some of the technology required to implement on-orbit 3D freeform printing in the space environment using resin formulations of the present disclosure. Given the results above, it is clear that the electromechanical and photopolymerization aspects of unsupported 3D freeform printing an antenna element such as a paraboloid or diffraction beam former is reasonable and demonstrated. Further, given the RF performance testing, it is clear that the RF performance of a 3D freeform printed antenna structure has adequate beamforming performance for microwave (about 10 to 13.5 GHz) communications use. Usefulness in a wider band is expected but not proven. Further, experimentation results showed that consumer-grade resins are not compatible with printing in a space environment due to O2 inhibition failure, pre-mature polymerization, and photoinitiator boil-off.

Practical Applications Using Resin Formulations in Space

When considering some practical applications during experimentation some hardware was incorporated, such as using a processor in communication with an additive manufacturing system and a sensor, to control an operation of the additive manufacturing system as a function of a pose of a spacecraft, to manufacture an object, i.e. in this case, an antenna, outside of the spacecraft. The spacecraft can be termed, a spacecraft bus, or some other terminology reference, as long as the reference is to whatever vessel is used in space. Thus, by controlling the spacecraft pose we are able to control the orientation of the spacecraft relative to an astronomical body, at a rate of change of light and radiation from movement of the spacecraft, as well as to extreme high and low temperatures, among other things, so that the additive manufacturing system could utilize space environmental aspects with the 3D printer to print large objects in space. As noted above, the spacecraft can include a controllable additive manufacturing system with the 3D printer and at least one sensor.

Figure 7:
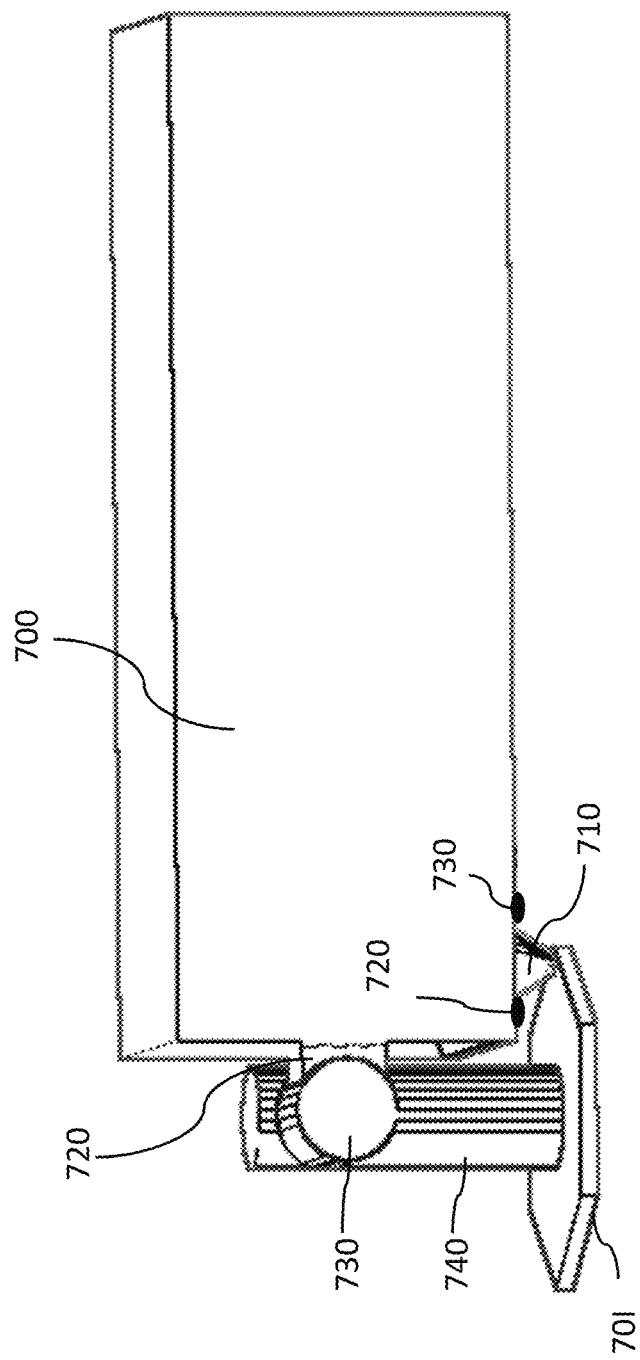
FIG. 7 is a schematic illustrating sensors of the command system positioned on an outer surface of the spacecraft bus sensing environmental conditions, according to an embodiment of the present disclosure.
Figure 8A:
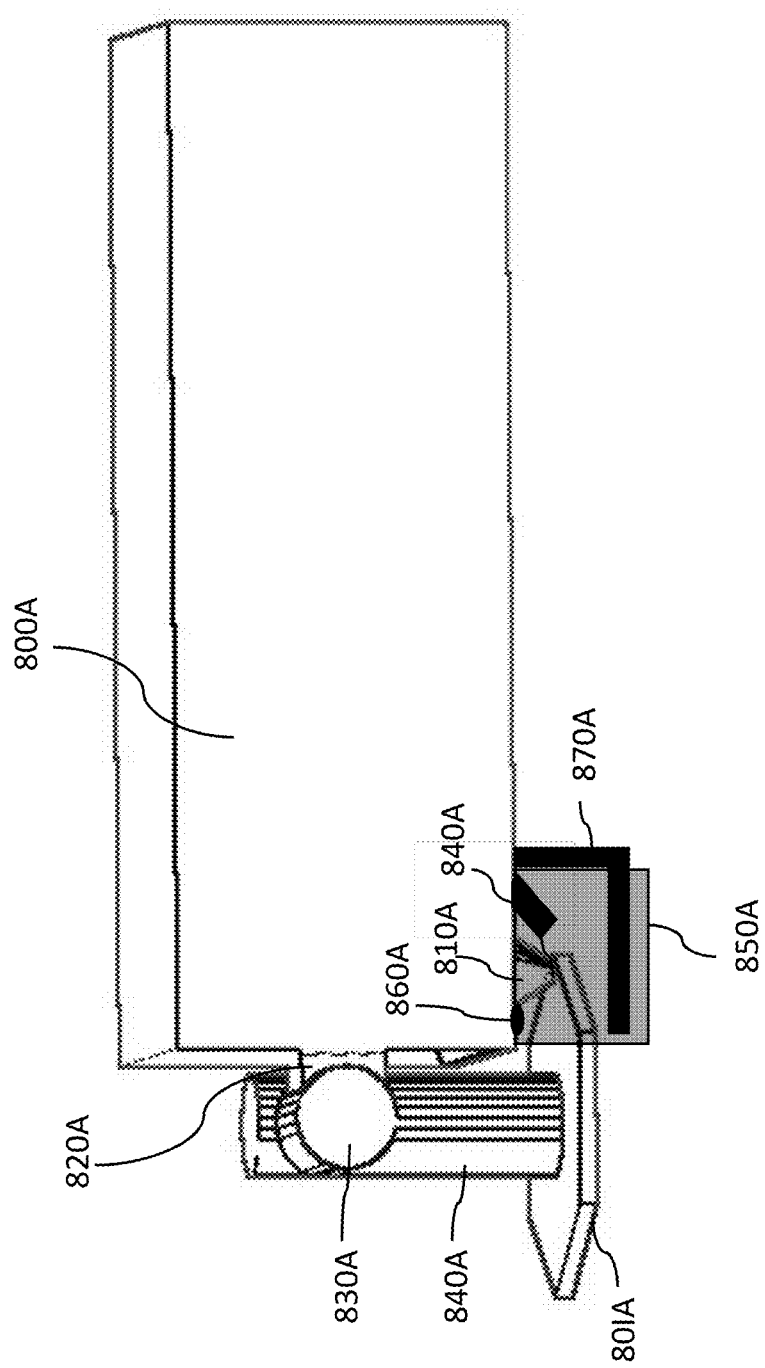
FIG. 8A is a schematic illustrating aspects that control the environmental conditions, of the area in space proximal to the extruder or other areas approximate other components, according to an embodiment of the present disclosure.
Figure 8B:
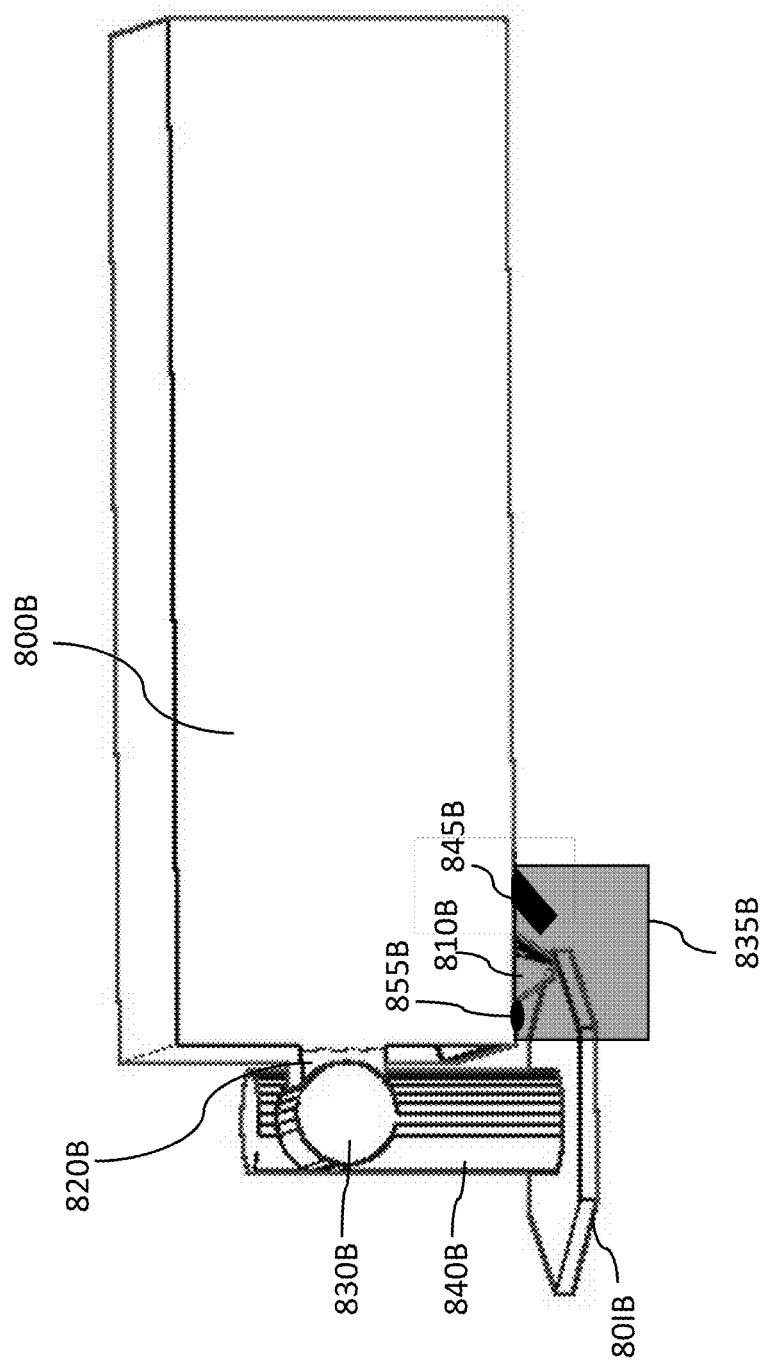
FIG. 8B is a schematic illustrating other aspects that control the environmental conditions, of the area in space proximal to the extruder or other areas approximate other components, according to an embodiment of the present disclosure.

FIG. 7, FIG. 8A and FIG. 8B are schematics illustrating sensors and devices of the command system positioned on an outer surface of the spacecraft bus, according to an embodiment of the present disclosure. By non-limiting example, referring to the FIG. 7, temperature sensor(s) 720 and light sensor(s) 730 are positioned on the same outer surface wall approximate the extruder 710. However, it is contemplated that sensors 720, 730, along with other sensors and devices, may be located anywhere on an outer surface of the spacecraft 700, or within the spacecraft. It is possible the sensors 720, 730, along with other sensors and devices, may be located within the spacecraft and be able to move via actuators (controlled by the processor and/or command system) from inside to outside of the spacecraft.

For example, referring to the FIG. 7, at least one temperature sensor 720 is in communication with the command system, and determines a temperature of the area in space proximal to the extruder 710. Wherein the processor controls the operation of the additive manufacturing system as a function of the pose of the spacecraft bus 700 in combination with the determined temperature, when the determined temperature is within a predetermined range. Wherein the predetermined temperature range for the operation of the additive manufacturing system can be within a range of 10 to 50 degrees Centigrade (as would be appropriate for liquid feedstock's of the UV-curing or two-part resin/catalyst feedstock's) or 180 to 350 degrees Centigrade (as would be appropriate to a thermoplastic feedstock supplied as a meltable filament).

Further, referring to the FIG. 7, at least one sensor 730 in communication with the command system, determines a light level originating from space, proximal the extruder 710. Wherein the processor controls the operation of the additive manufacturing system as a function of the pose of the spacecraft bus 700 in combination with the determined level of the light, when the determined level of the light is within a predetermined range. Wherein the predetermined range for the determined level of the light is within a range of 0.0001 milliwatt per square centimeter (1 watt/m$^3$) to 10.000 milliwatt per square centimeter (10 Kwatt/m$^3$). It is possible that other sensors such as earth-facing sensors, wherein the earth-facing cameras can be used for weather and resource monitoring or any cameras used to control and monitor the 3D building process or aspects related too. Further, it is contemplated the use of fabrication-aiding sensors may be incorporated into the additive manufacturing system. Also not shown are the 3D printing feedstock reservoirs, the solar cells, the batteries, the reaction wheels or attitude-control thrusters, science or communications payloads, control processors, any low-gain, omni-directional or backup antennas, etc., may be incorporated into the spacecraft bus.

FIG. 8A illustrates aspects that control the environmental conditions, of the area in space proximal the extruder 810A or other areas approximate other components. For example, FIG. 8 shows a controllable light (s) 840A, a controllable protective shield(s) 850A, a controllable device(s) 860A such as video, camera, lights, devices. For example, at least one controllable protective shield 850A in communication with the command system, controllably shields an amount of exposure of the light proximal the extruder 810A. Wherein the processor controls the at least one protective shield 850A as a function of the pose of the spacecraft bus 800A in combination with the determined level of the light, when the determined level of the light is within a predetermined range. The controllable protective shield 850A might be used when printing a UV-cured polymer during the sunlit part of the orbit or when printing in interplanetary space where the solar UV is nearly continuous, or to protect uncured polymer from UV reflected from the Moon when printing on the shadowed part of the orbit. Further still, at least one controllable device 860A such as an imaging device, camera device, light device, in communication with the processor and the additive manufacturing system, generates images while the feedstock is extruded from the extruder 810A onto an initial base structure, and based on the images, adaptively controls a rate of extrusion of the feedstock from the extruder 810A, a rate of relative motion between the extruder 810A to the initial base structure, or both.

Further, referring to FIG. 8A and FIG. 8B, FIG. 8A also shows a controllable feedstock deflector 870A that can be used to alter the flow of the feedstock, that is positioned approximate the extruder 810A and in communication with the processor, controls flow (and expansion, if an expanding foam type feedstock is used) of the feedstock during extrusion to form at least one surface of the manufactured object. Wherein the processor controls the feedstock deflector 870A as a function of a rate of extrusion of the feedstock from the extruder 810A, a rate of relative motion between the extruder 810A to the initial base structure, or both. Further still, the feedstock can be a light curable feedstock. Wherein at least one controllable light source 855B of FIG. 8B in communication with the command system, can project one or more light beam onto a surface of the feedstock, such that the feedstock is a light-curable material. Wherein the processor controls the light source 855B of FIG. 8B as a function of the pose of the spacecraft bus in combination with a level of the light from the controllable light source.

FIG. 8B shows a controllable light reflector(s) and a controllable light deflector(s) 835B, a controllable heating and cooling device(s) 845B and a controllable multi-beam light source 855B and may include multiple beams at one or more different levels of light beams approximate the extruder 810B. For example, at least one controllable light reflector 835B in communication with the command system, controllably reflects a level of light onto a surface of the feedstock, such that the feedstock is a light-curable material, and the light is one or a combination of light originating from space, or a controllable light source 855B in communication with the command system. Wherein the processor controls the operation of the controllable light reflector 835B as a function of the pose of the spacecraft bus 800B in combination with the determined level of the light, when the determined level of the light is within a predetermined range.

It is not necessary that all embodiments of the present disclosure use a metamaterial as the electromagnetically active agent. If extensible boom 820B, tilt motor 830B, and rotation motor 840B are operated according to the equation of a parabola, it is possible to print a 3D printed support structure 850B that is mechanically and visually parabolic rather than flat. In this case, it would be appropriate to face the 3D printed support structure 850B with a conductive metal film such as metallized Mylar, producing a much more classical design. Another advantage of this non-metamaterial parabolic design is that metamaterials are often narrowband devices, operable only over a narrow wavelength range, while a metallic parabolic reflector is very wideband and could conceivably operate well over a 10:1 wavelength range. It is also not necessary that the metamaterial design used in the antenna be the split ring resonators shown. Other metamaterial unit cells such as "mushroom fields" (arrays of small capacitive hats over a conductive backplane) or self-resonant inductive coils may also be used.

Figure 9:
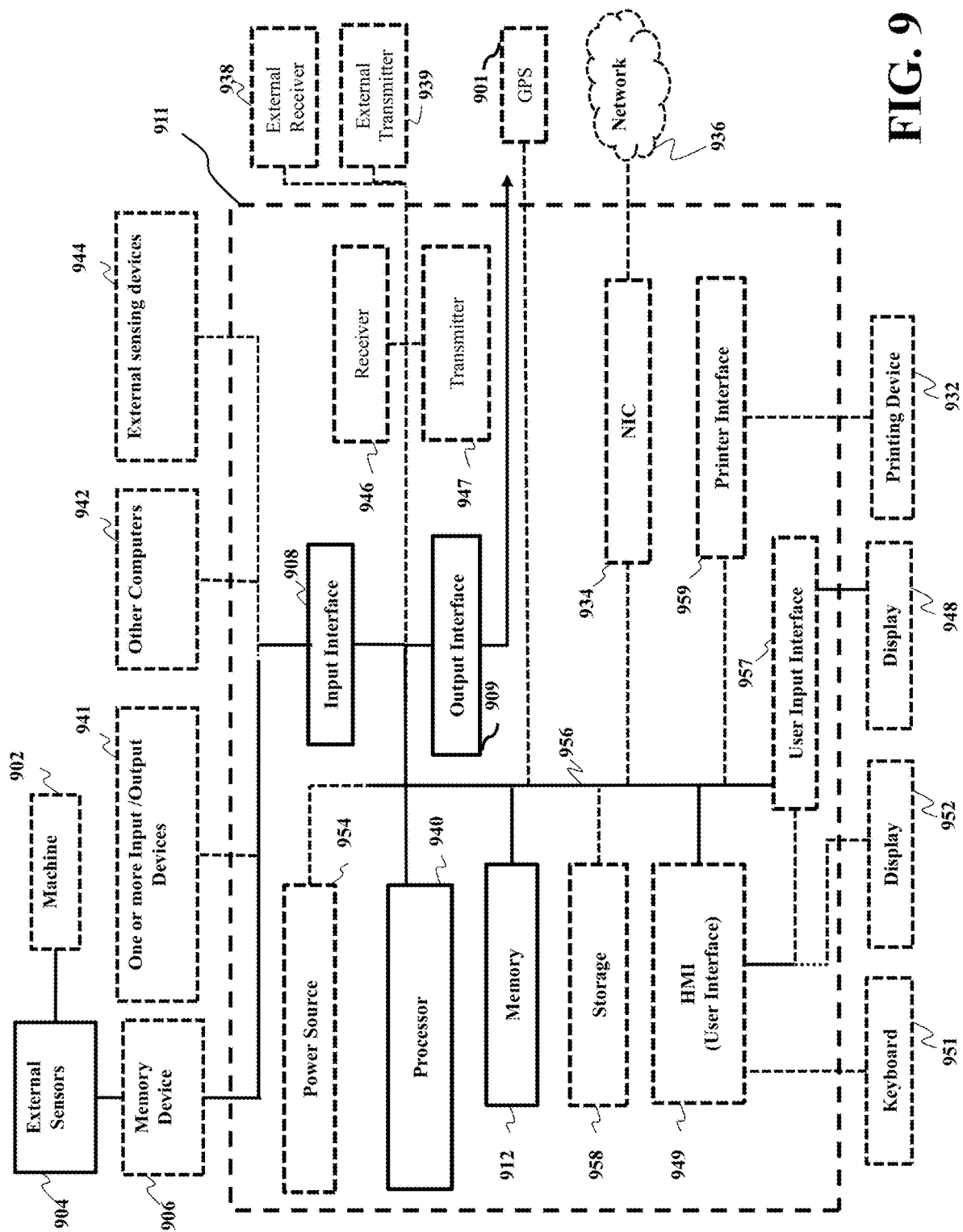
FIG. 9 is a block diagram of illustrating the processor or computer in communication with the command system of FIG. 9, that can be implemented using an alternate computer or processor, according to embodiments of the present disclosure.

FIG. 9 is a block diagram of illustrating the processor or computer in communication with the command system, that can be implemented using an alternate computer or processor, according to embodiments of the present disclosure. Although many parts in FIG. 9 are not normally needed when the satellite is in orbit or in interplanetary space, they are built-in to many COTS processors, and are definitely useful during the research and development, assembly and on-ground testing and validation procedures that the satellite must be subjected to before launch. As the launch of even a small satellite represents a cost of several million dollars, it should be expected that every opportunity to test, verify, and assure complete functionality will be taken before launch. Additionally, some of the blocks in FIG. 9 can continue to be useful after launch, as their output can be remotely linked via the NIC network interface 934 to the appropriate physical equipment either on another spacecraft, or on a ground control station. The controller 911 includes a processor 940, computer readable memory 912, storage 958 and user interface 949 with display 952 and keyboard 951, which are connected through bus 956. For example, the user interface 949 in communication with the processor 940 and the computer readable memory 912, acquires and stores the data in the computer readable memory 912 upon receiving an input from a surface, keyboard surface, of the user interface 957 by a user.

Contemplated is that the memory 912 can store instructions that are executable by the processor, historical data, and any data to that can be utilized by the methods and systems of the present disclosure. The processor 940 can be a single core processor, a multi-core processor, a computing cluster, or any number of other configurations. The processor 940 can be connected through a bus 956 to one or more input and output devices. The memory 912 can include random access memory (RAM), read only memory (ROM), flash memory, flash memory, nonvolatile memory or any other suitable memory systems.

Still referring to FIG. 9, a storage device 958 can be adapted to store supplementary data and/or software modules used by the processor. For example, the storage device 958 can store historical data and other related data as mentioned above regarding the present disclosure. Additionally, or alternatively, the storage device 958 can store historical data similar to data as mentioned above regarding the present disclosure. The storage device 958 can include a hard drive, a flash drive, a nonvolatile memory, an optical drive, a thumb-drive, an array of drives, or any combinations thereof. The system can be linked through the bus 956 optionally to a display interface (not shown) adapted to connect the system to a display device (not shown), wherein the display device can include a computer monitor, camera, television, projector, or mobile device, among others.

The controller 911 can include a power source 954, depending upon the application the power source 954 may be optionally located outside of the controller 911. Linked through bus 956 can be a user input interface 957 adapted to connect to a display device 948, wherein the display device 948 can include a computer monitor, camera, television, projector, or mobile device, among others. A printer interface 959 can also be connected through bus 956 and adapted to connect to a printing device 932, wherein the printing device 932 can include a liquid inkjet printer, solid ink printer, large-scale commercial printer, thermal printer, UV printer, or dye-sublimation printer, among others. A network interface controller (NIC) 934 is adapted to connect through the bus 956 to a network 936, wherein data or other data, among other things, can be rendered on a third party display device, third party imaging device, and/or third party printing device outside of the controller 911.

Still referring to FIG. 9, the data or other data, among other things, can be transmitted over a communication channel of the network 936, and/or stored within the storage system 958 for storage and/or further processing. Further, the data or other data may be received wirelessly or hard wired from a receiver 946 (or external receiver 938) or transmitted via a transmitter 947 (or external transmitter 939) wirelessly or hard wired, the receiver 946 and transmitter 947 are both connected through the bus 956. Further, a GPS 901 may be connected via bus 956 to the controller 911. The controller 911 may be connected via an input interface 908 to external sensing devices 944 and external input/output devices 941. The controller 911 may be connected to other external computers 942. An output interface 909 may be used to output the processed data from the processor 940.

At least embodiment of the present disclosure includes a spacecraft having a spacecraft bus. The spacecraft bus includes an additive manufacturing system having at least one extruder for delivering feedstock to print an object outside of the spacecraft bus. Wherein the feedstock includes a resin formulation having: (1) a mixture of low volatility oligomers is about 40% to 75% weight of the resin formulation; (2) a plasticizer is about 25% to 55% by weight of the resin formulation; (3) a photoinitiator is about 0.1% to 3.0% by weight of the resin formulation; (4) a thermal inhibitor is about 0.001% to 4% by weight of the resin formulation; and (5) a defoaming agent is about 0.0001% to 0.1% by weight of the resin formulation. A sensor of the spacecraft bus for determining a pose of the spacecraft bus relative to an astronomical body. At least one processor in communication with the additive manufacturing system and the sensor, controls an operation of the additive manufacturing system as a function of the pose of the spacecraft bus, to manufacture the object outside of the spacecraft bus.

Some aspects that can be incorporated with the spacecraft embodiment can include the pose of the spacecraft bus includes one or combination of an attitude of the spacecraft bus and an orbital position of the spacecraft bus with respect to the astronomical body, such that the astronomical body is from the group consisting of the Sun, the Earth, the Moon or fixed stars. Another aspect can be a command system in communication with the processor and the additive manufacturing system, for determining, controlling, or both, environmental conditions of an area in space proximal the extruder. Wherein the processor controls the operation of the additive manufacturing system as a function of the pose of the spacecraft bus, in combination with the command system determination of the environmental conditions or the control the environmental conditions, of the area in space proximal to the extruder. Another aspect may be that at least one temperature sensor can be in communication with the command system, that determines a temperature of the area in space proximal to the extruder. Wherein the processor controls the operation of the additive manufacturing system as a function of the pose of the spacecraft bus in combination with the determined temperature, when the determined temperature is within a predetermined range. Still another aspect can be that at least one sensor in communication with the command system, can determine a light level originating from space, proximal the extruder, wherein the processor controls the operation of the additive manufacturing system as a function of the pose of the spacecraft bus in combination with the determined level of the light, when the determined level of the light is within a predetermined range.

Definitions & Nomenclature

The "Definitions & Nomenclature" are representative definitions gained or learned from experimentation and can be understood as at least one understanding of the term or phrase, such that these definitions are only provided to assist in further understanding the embodiments of the present disclosure.

3D freeform printing—3D printing with only a minimal (if any) supporting substrate; layers may or may not be parallel or even continuous, unlike typical "by the slice" 3D printing of increasing Z-level cross-sections, starting from a flat and supporting substrate.

Oligomer—a partially polymerized resin. Unlike monomers that are composed of single unit-cell molecules, oligomers are chains of tens to tens of thousands of the unit cells. Such large molecules produce a liquid that is far more viscous, and with a far lower vapor pressure, than the original single unit-cell molecules of the monomer. Oligomers usually contain a number of available chemical bond sites (functional groups) and can be further polymerized.

Photoinitiator—a chemical that absorbs photons (usually deep blue or UV) and splits, producing free radicals and molecules that trigger polymerization of a monomer or oligomer. Photoinitiators can be catalytic or consumable. Typically, 1 to 3 percent of an oligomer-based ready-to-print resin is photoinitiator. Thermal polymerization—non-photoinitiated polymerization events. These are caused by the thermodynamically-rare event of a high energy oligomer molecule bonding to another molecule without the assistance of a photoinitiator or catalyst.

Inhibitor—the reverse of a photoinitiator. Typically, these molecules scavenge free radicals, thereby preventing polymerization of the feedstock mix. To trigger polymerization, enough UV is supplied to "burn through" the scavenging inhibitor molecules capacity and trigger bulk polymerization. Inhibitors also prevent thermal polymerization.

Polymer—the fully polymerized resin. Linear resins are composed of long unbranching chains, usually remain meltable at some elevated temperatures (thermoplastic), and are formed by polymerizing monomers or oligomers with one functional group. Cross linked resins, often called thermosetting resins for historical reasons, are formed from monomers or oligomers with two or more functional groups and generally can no longer be melted; at high temperatures (>300° C.) they slowly decompose into their component elements. Further, the term "polymer" refers to a polymerized molecule having one or more monomer specifies, and includes homopolymers and copolymers.

Plasticizer—a bulky molecule added to the feedstock that does not participate in the polymerization reaction. Instead, it separates strands of the polymer chains, providing room for the polymer chains to flex on the molecular scale without breaking. Addition of plasticizer prevents stress concentrations, cracking, and improves overall structural properties.

Command System can determine the environmental conditions such as temperature, light, pressure, radiation, or other environmental conditions of space. As well as, control the environmental conditions, of an area in space proximal to the extruder (or in the area the 3D printer prints outside of the spacecraft), or other components, via controllable reflectors, controllable light deflectors, controllable heating and cooling devices, controllable light sources, controllable protective shield(s), controllable devices including video and cameral devices, etc. The location of the command system and processor may be located on the spacecraft or some other location, i.e. directly wired to the components of the additive manufacturing system or wirelessly connected to the additive manufacturing system.

Photopolymer or light-activated resin is a polymer that changes its properties when exposed to light, often in the ultraviolet or visible region of the electromagnetic spectrum. These changes are often manifested structurally, for example hardening of the material occurs as a result of cross-linking when exposed to light. For example, a mixture of monomers, oligomers, and photoinitiators that conform into a hardened polymeric material through a process called curing may be considered. Curable materials are widely used for medical, printing, and photoresist technologies. Changes in structural and chemical properties can be induced internally by chromophores that the polymer subunit already possesses, or externally by addition of photosensitive molecules. Typically a photopolymer consists of a mixture of multifunctional monomers and oligomers in order to achieve the desired physical properties, and therefore a wide variety of monomers and oligomers have been developed that can polymerize in the presence of light either through internal or external initiation. Photopolymers undergo a process called curing, where oligomers are cross-linked upon exposure to light, forming what is known as a network polymer. The result of photo curing is the formation of a thermoset network of polymers. One of the advantages of photo-curing is that it can be done selectively using high energy light sources, for example lasers, however, most systems are not readily activated by light, and in this case a photoinitiator is required. Photoinitiators are compounds that upon radiation of light decompose into reactive species that activate polymerization of specific functional groups on the oligomers. An example of a mixture that undergoes cross-linking when exposed to light is shown below. The mixture consists of monomeric styrene and oligomeric acrylates. Photopolymerized systems are typically cured through UV radiation, since ultraviolet light is more energetic; however, the development of dye-based photoinitiator systems have allowed for the use of visible light, having potential advantages of processes that are more simple and safe to handle.

Additive Manufacturing System of FIG. 7, FIG. 8A, FIG. 8B can include a feedstock such as a material used to construct a desired object. A feedstock container such as a spool for filament feedstock, or a tank or syringe for liquid and slurry feedstock's. It is possible the feedstock may not have a container depending upon the feedstock used. The additive manufacturing system may have a two-part catalyst/resin feedstock's, and a feedstock feed device such as a filament drive capstan and pinch roller with a motor drive for filament feedstock, or a motorized pump or motorized syringe for fluid feedstock's. At least one extruder such as a nozzle to place the feedstock at a particular location. For example, where the feedstock is thermoplastic, the additive manufacturing systems may have an extruder that includes a heater and temperature sensor to melt the feedstock. While types of additive manufacturing systems may use a liquid feedstock, the extruder may contain a mixing device to mix the resin and catalyst liquids before placement in a particular location. A positioning system to place the extrusion with the extruding feedstock at a particular desired location with respect to the location of the desired object. Further, a computer or other processor, having a memory. The memory itself can contain a set of instructions which specify, among other things, the simultaneous timing and execution of control of the feedstock movement rates, control of the temperature and mixing in the extruder, and control of the speed and motion of the extruder with respect to the object being constructed. Further still, the processor can execute these instructions as well as other instructions with the timings specified, in sequence, to construct the desired object. It is contemplated the additive manufacturing system could be contained within a portion of the spacecraft, and maneuvered outside of the spacecraft via an outer door located on an outer surface of the spacecraft. However, other configurations of the location and maneuverability of the additive manufacturing system are contemplated.

Other Aspects—an oligomer-only feedstock composed by weight of 10% of a third oligomer of about 0% to 20% by weight low-volatility aliphatic urethane acrylate oligomer with about nine functional groups and a viscosity of about 180000 cps, wherein the nine functional group oligomer is a clear liquid multifunctional urethane acrylate oligomer, may be sartomercnnine zeroonethree oligomer; 10% of a second oligomer of about 0% to 20% by weight low-volatility aliphatic urethane acrylate oligomer with about two functional groups and a viscosity of about 7000 cps, the two functional group oligomer is an aliphatic polyester based urethane diacrylate oligomer, may be cnninenine one oligomer; 40% a first oligomer of about 0 to 100% by weight low-volatility aliphatic urethane acrylate oligomer with about six functional groups and a viscosity of about 3500 cps, wherein the six functional group oligomer is an aliphatic polyester based urethane hexaacrylate oligomer, may be cnninesixeight oligomer (all three are aliphatic urethane acrylate oligomers); and 40% of a plasticizer, such that the plasticizer is a vacuum oil with a vapor pressure at 100 deg C. of less than 10○-4 kPa, wherein the vacuum oil is a polyphenyl ether vacuum oil, that is a multi-ring polyphenyl ether, may be considered santovacnine vacuum oil.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

A chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

Additive manufacturing can include systems ae used to print or otherwise build 3D objects, (i.e. parts, components, etc.), from digital representations of the 3D objects (e.g., AMF and STL format files) using one or more additive manufacturing techniques. Examples of some additive manufacturing techniques can be extrusion-based techniques, jetting, selective laser sintering, powder/binder jetting, electron-beam melting, and stereolithographic processes. For each of these techniques, the digital representation of the 3D object can be initially sliced into multiple horizontal layers. For each sliced layer, a tool path can then be generated, which provides instructions for the particular additive manufacturing system to print the given layer. For example, in an extrusion-based additive manufacturing system, a 3D object may be printed from a digital representation of the 3D object in a layer-by-layer manner by extruding a flowable part material. The objects material(s) can be extruded through an extrusion tip carried by a print head of the system, and is deposited as a sequence of roads on a platen in an x-y plane. The extruded object material(s) fuses to previously deposited object material, and solidifies upon a drop in temperature. The position of the print head relative to the substrate is then incremented along a z-axis (perpendicular to the x-y plane), and the process is then repeated to form a 3D part resembling the digital representation.

Additive Manufacturing in Space

Space Manufacturing is the production of manufactured goods in an environment outside a planetary atmosphere. Typically this includes conditions of microgravity and hard vacuum. Manufacturing in space has several potential advantages over Earth-based industry.

a) The unique environment can allow for industrial processes that cannot be readily reproduced on Earth;

b) Raw materials could be lifted to orbit from other bodies within the solar system and processed at a low expense compared to the cost of lifting materials into orbit from Earth; and c) Potentially hazardous processes can be performed in space with minimal risk to the environment of the Earth or other planets.

The space environment is expected to be beneficial for production of a variety of products. Once the heavy capitalization costs of assembling the mining and manufacturing facilities is paid, the production will need to be economically profitable in order to become self-sustaining and beneficial to society. The most significant cost is overcoming the energy hurdle for boosting materials into orbit. Once this barrier is significantly reduced in cost per kilogram, the entry price for space manufacturing can make it much more attractive to entrepreneurs. Economic requirements of space manufacturing imply a need to collect the requisite raw materials at a minimum energy cost. The economical movement of material in space is directly related to the delta-v, or change in velocity required to move from the mining sites to the manufacturing plants. Near-Earth asteroids, Phobos, Deimos and the lunar surface have a much lower delta-v compared to launching the materials from the surface of the Earth to Earth orbit.

Space Environment has several unique differences between the properties of materials in space compared to the same materials on the Earth. These differences can be exploited to produce unique or improved manufacturing techniques. The microgravity environment allows control of convection in liquids or gasses, and the elimination of sedimentation. Diffusion becomes the primary means of material mixing, allowing otherwise immiscible materials to be intermixed. The environment allows enhanced growth of larger, higher-quality crystals in solution. The ultraclean vacuum of space allows the creation of very pure materials and objects. The use of vapor deposition can be used to build up materials layer by layer, free from defects.

Surface tension causes liquids in microgravity to form perfectly round spheres. This can cause problems when trying to pump liquids through a conduit, but it is very useful when perfect spheres of consistent size are needed for an application. Space can provide readily available extremes of heat and cold. Sunlight can be focused to concentrate enough heat to melt the materials, while objects kept in perpetual shade are exposed to temperatures close to absolute zero. The temperature gradient can be exploited to produce strong, glassy materials.

3D Printing in Space, 3D printing items in space holds many advantages over manufacturing situated on Earth. With 3D printing technologies, rather than exporting tools and equipment from Earth into space, astronauts have the option to manufacture needed items directly. On-demand patterns of manufacturing make long-distance space travel more feasible and self-sufficient as space excursions require less cargo. Mission safety is also improved. Some advantages of 3D printing in space can be as easy customization, minimal raw material waste, optimized parts, faster production time, integrated electronics, limited human interaction, and option to modify the printing process.

Embodiments

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described by way of examples of preferred embodiments, it is to be understood that various other adaptations and modifications can be made within the spirit and scope of the present disclosure. Therefore, it is the object of the appended claims to cover all such variations and modifications as come within the true spirit and scope of the present disclosure.

What is claimed is:

1. A resin formulation comprising:
   a mixture of low volatility oligomers is about 40% to 75% weight of the resin formulation, wherein the mixture of low volatility oligomers comprises:
   a first low-volatility aliphatic urethane acrylate oligomer with six functional groups;
   a second low-volatility aliphatic urethane acrylate oligomer with two functional groups; and
   a third low-volatility aliphatic urethane acrylate oligomer with nine functional groups;
   a plasticizer is about 25% to 55% by weight of the resin formulation;
   a photoinitiator is about 0.1% to 3.0% by weight of the resin formulation;
   a thermal inhibitor is about 0.001% to 4% by weight of the resin formulation; and
   a defoaming agent is about 0.0001% to 0.1% by weight of the resin formulation.

2. The resin formulation of claim 1, wherein the mixture of low volatility oligomers is combined with the photoinitiator, the thermal inhibitor and the defoaming agent, and mixed, then degassed at a temperature of about 60 deg C. and at a pressure of less than 10 kPa for at least 10 minutes.

3. The resin formulation of claim 1, wherein
   the first low-volatility aliphatic urethane acrylate oligomer is of about 0 to 100% by weight and a viscosity of about 3500 cps;
   the second low-volatility aliphatic urethane acrylate oligomer is of about 0% to 20% by weight and a viscosity of about 7000 cps; and
   the third low-volatility aliphatic urethane acrylate oligomer is of about 0% to 20% by weight and a viscosity of about 180000 cps.

4. The resin formulation of claim 3, wherein the first low-volatility aliphatic urethane acrylate oligomer is an aliphatic polyester based urethane hexaacrylate oligomer.

5. The resin formulation of claim 3, wherein the second low-volatility aliphatic urethane acrylate oligomer is an aliphatic polyester based urethane diacrylate oligomer.

6. The resin formulation of claim 3, wherein the third low-volatility aliphatic urethane acrylate oligomer is a clear liquid multifunctional urethane acrylate oligomer.

7. The resin formulation of claim 1, wherein the plasticizer is a vacuum oil with a vapor pressure at 100 deg C. of less than 10{circle around ( )}-4 kPa.

8. The resin formulation of claim 7, wherein the vacuum oil is a polyphenyl ether vacuum oil.

9. The resin formulation of claim 8, wherein the polyphenyl ether vacuum oil is a multi-ring polyphenyl ether.

10. The resin formulation of claim 7, wherein the vacuum oil is polyphenyl ether that is a five ring polyphenyl ether.

11. The resin formulation of claim 1, wherein the resin formulation is usable as a resin feedstock, and wherein the photoinitiator is bis-acylphosphine oxide added at a rate of about 1% by weight over the resin feedstock.

12. The resin formulation of claim 1, wherein the resin formulation is usable as a resin feedstock, and wherein the thermal inhibitor is 4-methoxyphenol added at a rate of about 3% by weight over the resin feedstock.

13. The resin formulation of claim 1, wherein the resin formulation is usable as a resin feedstock, and wherein the thermal inhibitor is phenothiazine added at a rate of about 0.1% to 0.16% by weight over the resin feedstock.

14. The resin formulation of claim 1, wherein the resin formulation is usable as a resin feedstock, and wherein the defoaming agent is added at less than 1% by weight over the resin feedstock.

15. The resin formulation of claim 14, wherein the defoaming agent is a long-chain alkane mix.

16. The resin formulation of claim 14, wherein the defoaming agent comprises a long chain alkane mix, and wherein the long chain alkane mix is a solution of foam-destroying polymers and polysiloxanes.

17. The resin formulation of claim 1, wherein the mixture of low volatility oligomers is combined with the photoinitiator, the thermal inhibitor and the defoaming agent, along with an additional intentional foaming agent, and mixed, prior to degassing.

18. The resin formulation of claim 17, wherein the additional foaming agent is benzoic acid added at a rate of 0.0001 to 0.5% by weight over a total combined resin feedstock.

19. The resin formulation of claim 17 wherein the additional foaming agent is a gas in a form of microbubbles less than 50 microns in diameter when in a pressure and a solution equilibrium at room temperature and at room pressure.

20. The resin formulation of claim 19 wherein the gas is one of air, argon, nitrogen, oxygen, helium, methane, ethane, ethylene, propane, propene, cyclopropane, chloromethane, dichloromethane, fluoromethane, difluoromethane, trifluoromethane, or tetrafluoromethane.

21. The resin formulation of claim 17 wherein the additional foaming agent is a combination of a dissolved gas and a fine particulate providing multiple nucleation sites.

22. The resin formulation of claim 21 wherein the dissolved gas is one of air, argon, nitrogen, oxygen, helium, methane, ethane, ethylene, propane, propene, cyclopropane, chloromethane, dichloromethane, fluoromethane, difluoromethane, trifluoromethane, or tetrafluoromethane added at 0.0001 to 5% by weight.

23. The resin formulation of claim 21 wherein the fine particulate providing multiple nucleation sites is carbon fiber less than 0.1 mm in length, carbon nanotubes less than 0.01 mm in length, ground silica of a size less than 0.1 mm diameter, silica microballoons less than 0.1 mm in diameter, ground silica microballoons less than 0.05 mm in diameter, or pyrogenic (fumed) silica added at 0.00001% to 5.0% by weight.

24. The resin formulation of claim 17 wherein the additional intentional foaming agent is a semivolatile material susceptible to microbubble formation when subjected to mechanical or ultrasonic pressure waves.

25. The resin formulation of claim 24, wherein the semivolatile material is a mix of hydrocarbons with six to 20 carbon atoms added in 0.01% to 5% by weight over the total combined resin feedstock.

26. The resin formulation of claim 1, wherein the mixture of low volatility oligomers is combined with the photoinitiator, the thermal inhibitor and the defoaming agent, and mixed, then degassed at a temperature of about 60 deg C. and at a pressure of less than 10 kPa for at least 10 minutes, such that upon completion of the degassing an additional intentional foaming agent is added.

27. A resin formulation comprising:
a mixture of low volatility oligomers is about 60% weight of the resin formulation, wherein the mixture of low volatility oligomers comprises:
a first low-volatility aliphatic urethane acrylate oligomer with six functional groups;
a second low-volatility aliphatic urethane acrylate oligomer with two functional groups; and
a third low-volatility aliphatic urethane acrylate oligomer with nine functional groups;
a plasticizer is about 40% by weight of the resin formulation;
a photoinitiator is about 1.0% by weight of the resin formulation;
a thermal inhibitor is about 3.0% by weight of the resin formulation; and
a defoaming agent is about 0.002% by weight of the resin formulation.

28. The resin formulation of claim 27, wherein the mixture of low volatility oligomers is combined with the photoinitiator, the thermal inhibitor and the defoaming agent, and mixed, then degassed at a temperature of about 60 deg C. and at a pressure of less than 10 kPa for at least 10 minutes.

29. The resin formulation of claim 27, wherein the resin formulation polymerizes by crosslinking to a stable heat-resistant solid when exposed to UV having a light absorption spectrum in a UV range of about 10 nm to about 460 nm.

30. The resin formulation of claim 27, wherein the photoinitiator has a peak sensitivity in a region of 370 nm to 415 nm, or the peak sensitivity of the photoinitiator is at about 305 nm.

31. A resin formulation comprising:
about 0.1%-5.0% by weight of a photoinitiator;
about 45%-99% by weight of oligomers in combination, wherein the oligomers in combination comprises:
a first low-volatility aliphatic urethane acrylate oligomer with six functional groups;
a second low-volatility aliphatic urethane acrylate oligomer with two functional groups; and
a third low-volatility aliphatic urethane acrylate oligomer with nine functional groups;
about 0%-60% by weight of a vacuum oil;
about 0%-5% by weight of a thermal inhibitor;
about 0%-1% by weight of a defoaming agent;
about 0%-5% by weight of a nonreacting gas, as microbubbles;
about 0%-5% by weight of a nonreacting gas, dissolved into solution;
about 0%-5% by weight of a particulate material possessing bubble nucleation sites; and
about 0%-5% by weight of a semivolatile material subject to microbubble formation when subjected to mechanical or ultrasonic pressure waves.

* * * * *